United States Patent
Stephens

(10) Patent No.: US 7,206,785 B1
(45) Date of Patent: Apr. 17, 2007

(54) IMPACT ANALYSIS OF METADATA

(75) Inventor: Robert Todd Stephens, Sharpsburg, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 916 days.

(21) Appl. No.: 10/000,607

(22) Filed: Oct. 24, 2001

(51) Int. Cl.
*G06F 17/00* (2006.01)
*G06F 7/00* (2006.01)

(52) U.S. Cl. .................................... 707/101
(58) Field of Classification Search .............. 707/1, 707/100, 101
See application file for complete search history.

(56) References Cited

U.S. PATENT DOCUMENTS

| | | | |
|---|---|---|---|
| 5,410,675 A * | 4/1995 | Shreve et al. .................. | 710/65 |
| 5,448,726 A * | 9/1995 | Cramsie et al. .......... | 707/103 R |
| 5,493,671 A * | 2/1996 | Pitt et al. ..................... | 707/203 |
| 5,708,828 A * | 1/1998 | Coleman ..................... | 715/523 |
| 5,873,093 A * | 2/1999 | Williamson et al. ..... | 707/103 R |
| 5,878,411 A * | 3/1999 | Burroughs et al. .......... | 707/4 |
| 5,937,402 A * | 8/1999 | Pandit ........................... | 707/4 |
| 5,943,665 A * | 8/1999 | Guha .......................... | 707/2 |
| 6,108,651 A * | 8/2000 | Guha .......................... | 707/4 |
| 6,122,641 A * | 9/2000 | Williamson et al. ..... | 707/103 R |
| 6,389,429 B1 * | 5/2002 | Kane et al. .................. | 707/200 |
| 6,760,734 B1 * | 7/2004 | Stephens ..................... | 707/102 |
| 6,968,339 B1 * | 11/2005 | Stephens ..................... | 707/101 |
| 2002/0078010 A1 * | 6/2002 | Ehrman et al. ................. | 707/1 |
| 2003/0009431 A1 * | 1/2003 | Souder et al. ................. | 707/1 |
| 2003/0126138 A1 * | 7/2003 | Walker et al. .............. | 707/100 |
| 2004/0138872 A1 * | 7/2004 | Nir .............................. | 704/10 |
| 2004/0205121 A1 * | 10/2004 | Stephens .................... | 709/203 |
| 2005/0102303 A1 * | 5/2005 | Russell et al. .............. | 707/101 |

OTHER PUBLICATIONS

Shoshani, A. "A Logical-Level Approach to Data Base Conversion", Proceedings of the 1975 ACM SIGMOD International Conference on Management of Data, 1975, pp. 112-122.*
Navathe, S.B. and J.P. Fry "Restructuring for Large Database: Three Levels of Abstraction", ACM Transactions on Database Systems (TODS), vol. 1, No. 2, Jun. 1976, pp. 138-158.*
Grundy, J., R. Mugridge, J. Hosking and P. Kendall "Generating EDI Message Translations from Visual Specifications", Proceedings of the 2001 International Conference on Automated Software Endineering, Nov. 26-29, 2001, pp. 35-42.*
UTC Corporation "Data Mapping", product description, downlooaded from www.uctcorp.com/datamap.html, Jan. 23, 2007.*
U.S. Appl. No. 09/851,478, filed May 9, 2001, Robert Todd Stephens.
Specification and Drawings of U.S. Appl. No 09/851,748, filed May 9, 2001.

* cited by examiner

*Primary Examiner*—Luke S Wassum
(74) *Attorney, Agent, or Firm*—Merchant & Gould

(57) ABSTRACT

Methods and systems for estimating impact between metadata descriptors are provided. A software program compares a first metadata descriptor with a second metadata descriptor and determines an impact rating between the metadata descriptors. The impact rating may be used to map metadata descriptors or as an indication of how a change in one database will effect other interrelated databases.

20 Claims, 13 Drawing Sheets

IMPACT ANALYSIS OF METADATA

BACKGROUND OF THE INVENTION

1. Field of the Invention

The invention relates to the field of computer systems and software. More specifically, the invention relates to systems and methods for predicting the relationship between information stored in databases.

2. Description of the Background

Computer databases store and organize data using "metadata." Metadata is often defined as "data about data." In other words, metadata describes the data contained within a metadata descriptor, and may also include information about how and when a particular set of data was collected or how the data is formatted. The study of metadata is essential to understanding the organization of a database as well as how one database relates to other databases. An example of metadata, or more specifically "a metadata descriptor," is a variable or field name for holding data, such as the metadata descriptor, "customer_last_name." The name of the metadata descriptor "customer_last_name" is an example of a metadata descriptor that a database administrator could use for a field name or variable that contains the customer's last name. In this example, "customer_last_name" is the metadata descriptor, while the actual last name, such as "Smith" is the data contained within the metadata descriptor in the database. A database administrator knows that "Smith" is a customer's last name only because of the metadata descriptor "customer_last_name."

Different databases may use different metadata descriptors to describe the same type of data. When data is exchanged from one database to another, an interface must be used to translate metadata descriptors from one database to metadata descriptors in the other database. For example, one database may use the metadata descriptor "customer_last_name," while a second database could use the metadata descriptor "cust_lt_nam" to describe identical data, i.e., a customer's last name. The metadata descriptors may also have different variable or character string lengths that would also be addressed by the interface between the databases.

In a large computer system, or in a large organization, there may be many databases, each with a separate naming standard. It is not uncommon for a large corporation to have thousands of databases, may be created by different database administrators and using a different naming standard. If data is to be exchanged between databases, a separate interface between each database is often necessary. In a system of databases, creating interfaces between databases is a large, tedious task, particularly if there are many databases. Furthermore, if a change is made in one database, the change must be made to all interfaces or databases with which the first database interacts. For example, if a variable string length is changed to include more or less characters, the change must be propagated throughout all the effected interfaces. Particularly in a large computer system, it is difficult and tedious to ascertain which interfaces and databases are affected by such a change.

One conventional method for facilitating communication between multiple databases involves mapping metadata descriptors to a consolidated database. The consolidated database includes a common naming standard. If each metadata descriptor within each database can be mapped to a particular "naming_standard" metadata_descriptor in the consolidated database, metadata descriptors from one database may be mapped through the consolidated database onto metadata descriptors in a second database. Such a consolidated database is often referred to as an "Enterprise Database" (EDB).

Even if a naming standard in a consolidated database is used, the process of mapping metadata descriptors to the consolidated database is normally a very tedious task. An administrator must be familiar with the naming standard used in the EDB as well as the metadata descriptors in each individual database. The metadata descriptors are manually mapped to the naming standard in the consolidated database. After the metadata descriptors from all of the different databases have been mapped onto the naming standard in the consolidated database, it is still difficult to ascertain how one change in one database will affect all of the other databases.

These and other problems are avoided and numerous other advantages are provided by the methods and systems described herein.

SUMMARY

According to the present invention, methods and systems are provided for predicting relationships between metadata descriptors. In one embodiment of the invention, two metadata descriptors are compared by a software application, and a rating is assigned to the relationship of the metadata descriptors based on the comparison. If two metadata descriptors appear similar to each other, a relatively high rating is assigned, while if two metadata descriptors appear dissimilar, a relatively low rating is assigned. The rating of the comparison between metadata descriptors is referred to herein as an "impact rating."

The impact rating may be used to predict which metadata descriptors in one database are related or the same as a second set of metadata descriptors in a second database. In addition, the impact rating between metadata descriptors may be used to relate metadata descriptors in a series of databases to a database that contains a naming standard. When a plurality of databases is compared to a naming standard database, inferences and predictions may be made between the relationships of each database. These predictions are useful to predict which metadata descriptors should be mapped to each other or to a naming standard metadata descriptor. The predictions may also be used to estimate the impact of one change in one database on other databases and interfaces between databases.

In one aspect of the invention, a software application compares a first metadata descriptor to a second metadata descriptor and determines an impact rating between the first and the second metadata descriptor. In another aspect, the software application extracts the first metadata descriptor from a first database.

In another aspect of the invention, the first metadata descriptor includes a first and a second level, and the second metadata descriptor includes at least one level. If the first level of the first metadata descriptor is equal to a level of the second metadata descriptor, the application adds a first rating to the impact rating between the first metadata descriptor and the second metadata descriptor. If the second level of the first metadata descriptor is equal to a level of the second metadata descriptor, the application adds a second rating to the impact rating between the first metadata descriptor and the second metadata descriptor. The second metadata descriptor includes a naming standard. Preferably, the first rating is higher than the second rating. Thus, the levels of the first metadata descriptor may be organized in a hierarchy, that is, a match to the first level is more indicative of a relationship than a match to the second level.

In yet another aspect of the invention, a software application determines if the first level of the first metadata descriptor is related to a level of the second metadata descriptor. If the first level of the first metadata descriptor is related to the level of the second metadata descriptor, the application adds a third rating to the impact rating between the first metadata descriptor and the second metadata descriptor. In another aspect of the invention, the application determines if the second level of the first metadata descriptor is related to a level of the second metadata descriptor. If the second level of the first metadata descriptor is related to a level of the second metadata descriptor, the application adds a fourth reading to the impact rating between the first metadata descriptor and the second metadata descriptor. Preferably, the first rating is greater than the third rating, and the second rating is greater than the fourth rating.

In one embodiment, determining if any two metadata descriptor levels are related includes determining if the levels are equated in an alias table and are not equal. In another embodiment, determining if any two metadata descriptor levels are related includes determining if the levels contain similar text characters.

In yet another aspect of the invention, an application extracts a third metadata descriptor from a third database, and the third metadata descriptor includes at least one level. The application determines an impact rating between the third metadata descriptor and the first metadata descriptor, and calculates an impact rating between the second metadata descriptor and the third metadata descriptor.

In still another aspect of the invention, a software application extracts a first metadata descriptor from a first database and compares a first metadata descriptor to a second metadata descriptor. The first metadata descriptor includes at least one of an entity level, a subentity level, an attribute level, a subattribute level, and a control word, and the second metadata descriptor includes at least one table and a plurality of tokens. In one embodiment, the application calculates a relative strength of the entity relationship (rsER) between the first metadata descriptor and the second metadata descriptor. The application then calculates a relative strength of attribute relationship (rsAttr) between the first metadata descriptor and the second metadata descriptor. The application calculates a relative strength of the mapping (rsMap) between the first metadata descriptor and the second metadata descriptor.

In one embodiment, the step of calculating a relative strength of the attribute relationship includes calculating a relative strength of the attribute relationship considering the relative strength of the entity relationship between the first metadata descriptor and the second metadata descriptor, and calculating a relative strength of the attribute relationship without considering the relative strength of the entity relationship. In another embodiment, the step of calculating a relative strength of the attribute relationship considering the relative strength of the entity relationship includes increasing the relative strength of the attribute relationship if the relative strength of the entity relationship is above a predetermined amount.

In one aspect of the invention, the relative strength of the mapping is calculated by adding the relative strength of the entity relationship and the relative strength of the attribute relationship. The relative strength of the mapping is the impact rating between the first metadata descriptor and the second metadata descriptor. In another embodiment, the relative strength of the mapping is calculated by adding the relative strength of the entity relationship, the relative strength of the attribute relationship considering the entity relationship, and the relative the strength of the attribute relationship without considering the entity relationship.

In another embodiment, the relative strength of the mapping is calculated using the formula:

$$RsMap = \frac{4(rsER) + 2(rsAttr) + rs(Attr*)}{7}$$

where rsMap is the relative strength of the mapping, rsER is the relative strength of the entity relationship, rsAttr is the relative strength of the attribute relationship considering the entity relationship, and rsAttr* is the relative strength of the attribute relationship without considering the entity relationship.

In one embodiment, the step of calculating the relative strength of the entity relationship includes adding a first rating to the relative strength of the entity relationship if the entity of the second metadata descriptor is equal to the table of the first metadata descriptor. A software program determines if the entity of the second metadata descriptor is related to the table of the first metadata descriptor, and adds a second rating to the relative strength of the entity relationship if the entity of the second metadata descriptor is related to the table of the second metadata descriptor. Preferably, the first rating is higher than the second rating.

In another aspect, the step of calculating the relative strength of the entity relationship includes adding a third rating to the relative strength of the entity relationship if the entity of the second metadata descriptor is equal to a token of the first metadata descriptor. A software program determines if the entity of the second metadata descriptor is related to a token of the first metadata descriptor, and adds a fourth rating to the relative strength of the entity relationship if the entity of the second metadata descriptor is related to a token of the second metadata descriptor. Preferably, the third rating is higher than the fourth rating.

In another aspect, the step of calculating the relative strength of the attribute relationship includes adding a fifth rating to the relative strength of the entity relationship if the attribute of the second metadata descriptor is equal to a token of the first metadata descriptor. A software program determines if the attribute of the second metadata descriptor is related to a token of the first metadata descriptor, and adds a sixth rating to the relative strength of the attribute relationship if the attribute of the second metadata descriptor is related to a token of the second metadata descriptor. Preferably, the fifth rating is higher than the sixth rating.

In another aspect, the step of calculating the relative strength of the attribute relationship includes considering the strength of the entity relationship. The step includes adding a fifth rating to the relative strength of the entity relationship if the attribute of the second metadata descriptor is equal to a token of the first metadata descriptor only if the relative strength of the entity relationship is above a predetermined amount. A software program determines if the attribute of the second metadata descriptor is related to a token of the first metadata descriptor, and adds a sixth rating to the relative strength of the attribute relationship if the attribute of the second metadata descriptor is related to a token of the second metadata descriptor only if the relative strength of the entity relationship is above a predetermined amount. Preferably, the fifth rating is higher than the sixth rating.

In yet another aspect of the invention, a system for estimating the impact in a computer system is provided. The system includes a first database, and a first metadata descriptor associated with the first database. A software application is in communication with the first database and a second database. A second metadata descriptor is associated with the second database. The software application is configured for implementing the method discussed above.

In still another aspect of the invention, computer readable medium for estimating impact in a computer system is provided. The computer readable medium includes instructions for extracting a first metadata descriptor from a first database, a second set of instructions for comparing the first metadata descriptor to the second metadata descriptor, and a third set of instructions for calculating an impact rating between the first metadata descriptor and the second metadata descriptor. The computer readable medium may be a diskette, compact disk, or hard drive.

The invention compares metadata descriptors and calculates an impact rating between two metadata descriptors. The impact rating provides an estimate of whether two metadata descriptors are related. The invention identifies metadata descriptors that are potentially related, thus reducing or eliminating the manual mapping process.

The identification of potentially related metadata descriptors has many uses. If direct mapping from metadata descriptors in one database to another is desired, the identification of potentially related metadata descriptors greatly reduces the manual mapping process. Once identified, potentially related metadata descriptors can be further investigated manually. Metadata descriptors that have not been identified as potentially related, or appear to have a low relative probability of relationship, may not need to be investigated at all. The identification of potentially related metadata descriptors may also be used as a prediction of how one change in a metadata descriptor will affect other databases that are in communication with a database containing the metadata descriptor to which a change is desired. In other words, if a metadata descriptor has a relatively high probability of relationship to many other metadata descriptors in other databases, a computer administrator could conclude that it would be more expensive to make a change to the metadata descriptor than if it had a high probability of relationship to relatively few other metadata descriptors in other databases.

These and other advantages will become apparent to those of ordinary skill in the art with reference to the detailed description and drawings.

DETAILED DESCRIPTION

Methods and systems for estimating the impact between metadata descriptors are provided. "Impact" or "impact rating" means a relative estimated measurement of the relationship between two metadata descriptors. An impact measurement is useful for mapping metadata descriptors from one database to another. Metadata descriptors with a relatively high impact are identified as having a higher probability of relationship than metadata descriptors with a relatively low impact. A computer administrator can identify metadata descriptors with relatively high impact to another metadata descriptor as potential candidates for direct mapping. This reduces or eliminates the number of metadata descriptors that must be examined in order to map metadata descriptors from one database to metadata descriptors in another database. In addition, impact measurements may be used to estimate how one change to a metadata descriptor in one database will affect metadata descriptors in other databases.

In one embodiment, a software application extracts a metadata descriptor from a first database and compares the first metadata descriptor to a second metadata descriptor. The application then calculates an impact rating between the first metadata descriptor and the second metadata descriptor. The impact rating provides a relative prediction of which metadata descriptors from the first database are related to specific metadata descriptors in the second database. For example, if the first metadata descriptor is similar to the second metadata descriptor, a relatively high impact rating will be assigned to the relationship between the first and the second metadata descriptors, indicating a relatively high probability of relationship. On the other hand, if the first metadata descriptor has no similarity to a second metadata descriptor, a relatively low impact rating will be assigned to the relationship.

Figure 1:
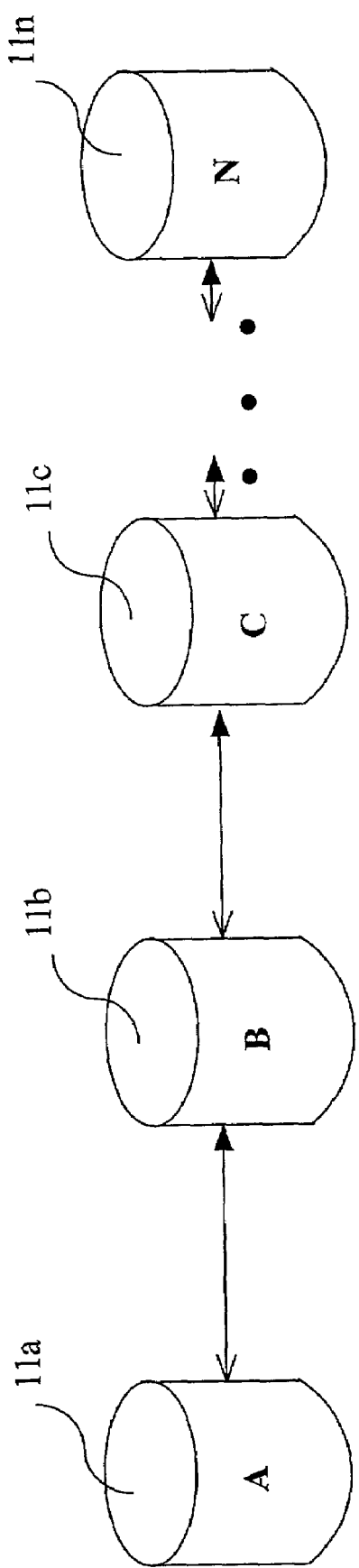
FIG. 1 is an embodiment of a system diagram of interconnected databases.

FIG. 1 is an exemplary system diagram of several interconnected databases. Database A 11a is in communication with database B 11b, database B 11b is in communication with database C 11c, and so forth. There may be any number (N) databases 11n. Information may be exchanged between databases A, B, C . . . N, 11a–n through an interface (or interfaces). Each database 11a–11n contains data that is organized using "metadata." As discussed previously, metadata is "data about data" or data that explains or describes data. For example, metadata may be in the form of a variable name or field name, such as "customer_last_name." The actual customer name, for example, Smith, is called data. On the other hand, the variable or "metadata descriptor" that contains the data "Smith" is customer_last_name.

In most large organizations, many databases are necessary to store all of the data used by the organization. It is often the case that each separate database uses a different set of metadata descriptors to describe the same data. One option to allow communication between databases is to redesign each database with a common naming standard. However, redesigning databases is costly and time consuming. Another option to communicate between databases without redesigning every database with a common naming standard is the use of interfaces. One or more interfaces translate metadata descriptors that describe the same data from one database to another such that the databases can communicate information.

Figure 2:
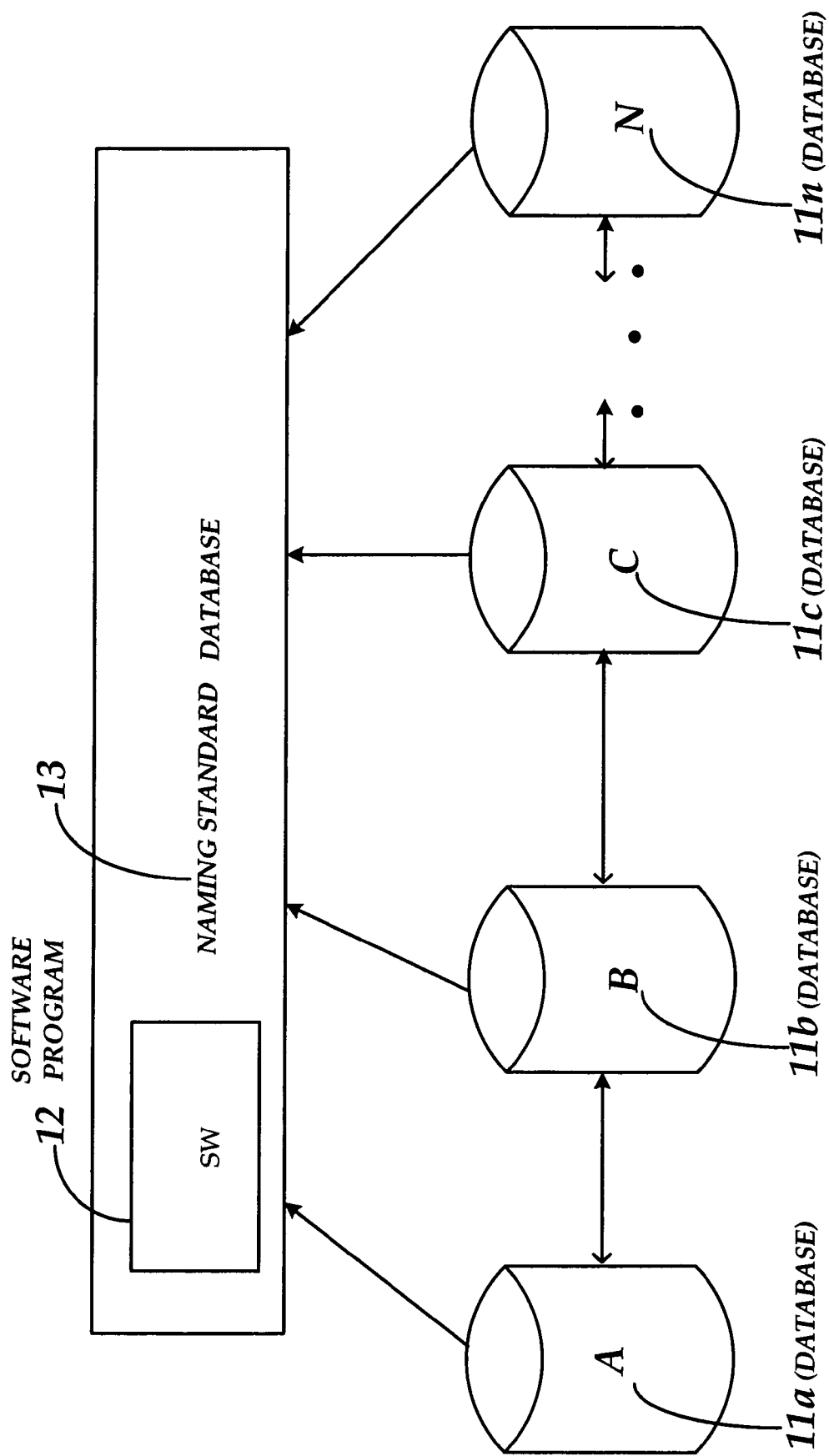
FIG. 2 is an embodiment of a system diagram of the interconnected databases of FIG. 1 that are mapped to a "naming standard" database.

FIG. 2 is a system diagram of several interconnected databases that are mapped to a "naming standard" database. A naming standard database is a database that contains a standard set of metadata descriptors. A naming standard database, as shown in FIG. 2, is used in one method for translating metadata descriptors from one database to another. Rather than using a separate interface between each database 11a–11n, the databases 11a–11n are all mapped to a naming standard database 13. The system shown in FIG. 2 facilitates communication between each database 11a–11n. Although each database 11a–11n may use a separate set of terminology for the metadata contained in the database, each database is mapped to the naming standard database. The naming standard database provides a translation of the metadata from each individual database 11a–11n. The naming standard database also includes a software program 12. The software program 12 may include software for analyzing metadata descriptors in any of the databases 11a–11n or the naming standard database 13. As depicted in FIG. 2, the software program 12 is run from the naming standard database 13. However, as would be understood by one of ordinary skill in the art, the software program 12 could be located on any computer processor that is in communication with the naming standard database 13 and the databases 11a–11n.

Figure 3:
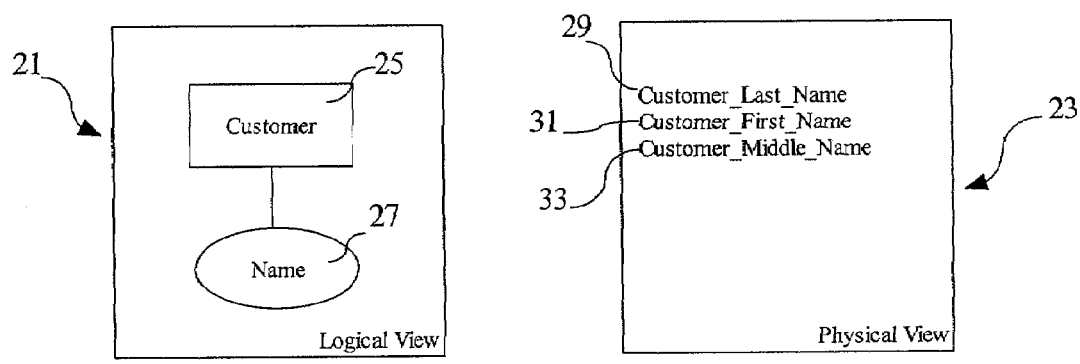
FIG. 3 is a diagram of a logical view and a physical view of metadata descriptors.

FIG. 3 is a graphical exemplary representation of the difference between the logical view 21 of metadata descriptors and the physical view 23. The logical view represents the way that computer programmers and users view the organization of a computer system logically. On the other hand, the physical view 23 is the way that a computer system is actually organized. For example, in the logical view, a user or programmer may think of a computer file as being a group of data that is stored together. However, in the actual physical system, a single file may be stored in many locations scattered across a disk. The logical view 21 also does not contain the correct terminology for implementation in a computer system. When a logical view 21 description is actually implemented in a computer system, it must be implemented using the physical view 23. The example shown in FIG. 3 is the logical view of a customer's name 21 stored in a database and the physical view of a customer's name 23 stored in a database.

In the logical view 21, the name 27 is related to the customer 25. In other words, a database may include a category of entities, called "customer" 25, and metadata associated with a customer 25, such as the name 27 of the customer. Additional data may also be associated with the customer 25, such as an address, phone number, credit card, etc. In the physical view 23, the customer's name is a set of fields or variables that are physically programmed into a database. The physical view includes a field for the customer's last name, "cusomer_last_name" 29, the customer's first name, "customer_first_name" 31, and the customer's middle name, "customer_middle_name" 33.

Each metadata descriptor contains at least one level of description. The term "level of description" or "level" refers to parts of a metadata descriptor. For example, the metadata descriptor "customer_last_name" contains three levels of description: customer, last, and name. These levels may be organized in a hierarchy of levels. A hierarchy of levels is useful for ranking the importance of levels when assigning an impact rating. In the example "customer_last_name," the term "customer" would probably be considered the highest hierarchical level in a database because the terms "last" and "name" relate to the customer as shown in the logical view 21.

According to the present invention, two metadata descriptors, such as the metadata descriptors described above, are compared and a relative impact rating is assigned based on the similarity of the metadata descriptors. The metadata descriptors may contain levels, which are compared to determine an impact rating. The present invention will be further illustrated by the following examples.

EXAMPLE 1

Figure 4:
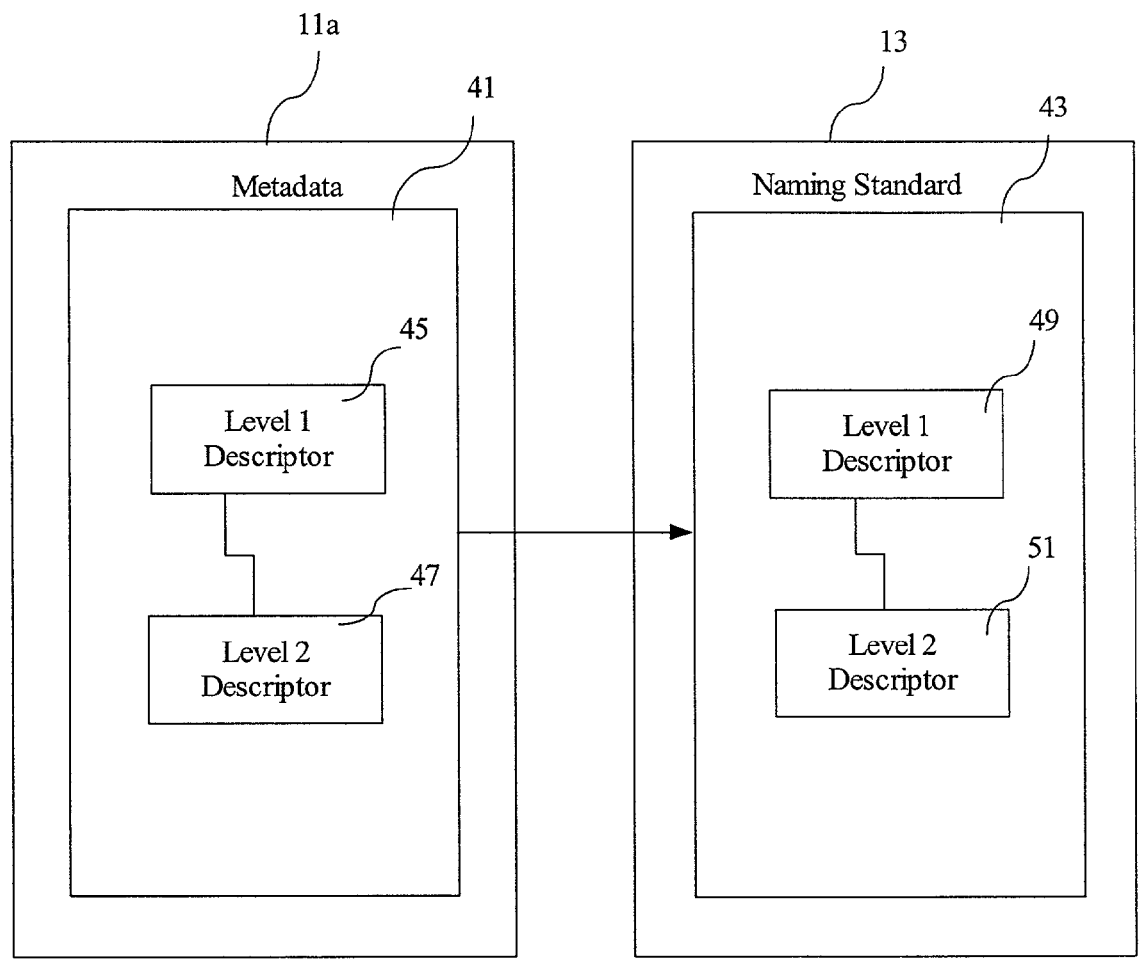
FIG. 4 is a diagram of an embodiment of components of metadata descriptors.

FIG. 4 is a diagram of the logical view of components of metadata descriptors having two levels. Metadata 41 from a first database 135a is mapped to a naming standard metadata descriptor 43 in a second database 135b. The metadata 41 includes a first level descriptor 45 and a second level descriptor 47. The naming standard metadata descriptor 43 also includes a first level descriptor 49 and a second level descriptor 51. Preferably, the first level descriptors 45 and 49 are more important in a hierarchy of description than the second level descriptors 47 and 51. In one embodiment, the level one descriptors 45 and 49 are entities and the level two descriptors 47 and 51 describe information about the entity.

In a database for a business that records information about people and other business entities, different metadata descriptors of people or businesses would be "level one" metadata descriptor entities in the database. An example of a level one descriptor "entity" in such a database is the term "customer," and an example of a level two descriptor that further describes information about the entity is the term "name." Other examples of level two descriptors that may further describe information about the level one descriptor "customer" include "address," "phone number," "credit card," etc. Other examples of level one "entity" descriptors in such a database might include "employee," "supplier," "contractor," and "retailer." The levels in a naming standard may be used as an indication of how important a term is to the relationship between metadata descriptors. In the above example, the first level, or entity level, may be more important to determining a relationship. Therefore, a higher rating is assigned if the first level is similar than if the second level is similar in a comparison of metadata descriptors.

Figure 5:
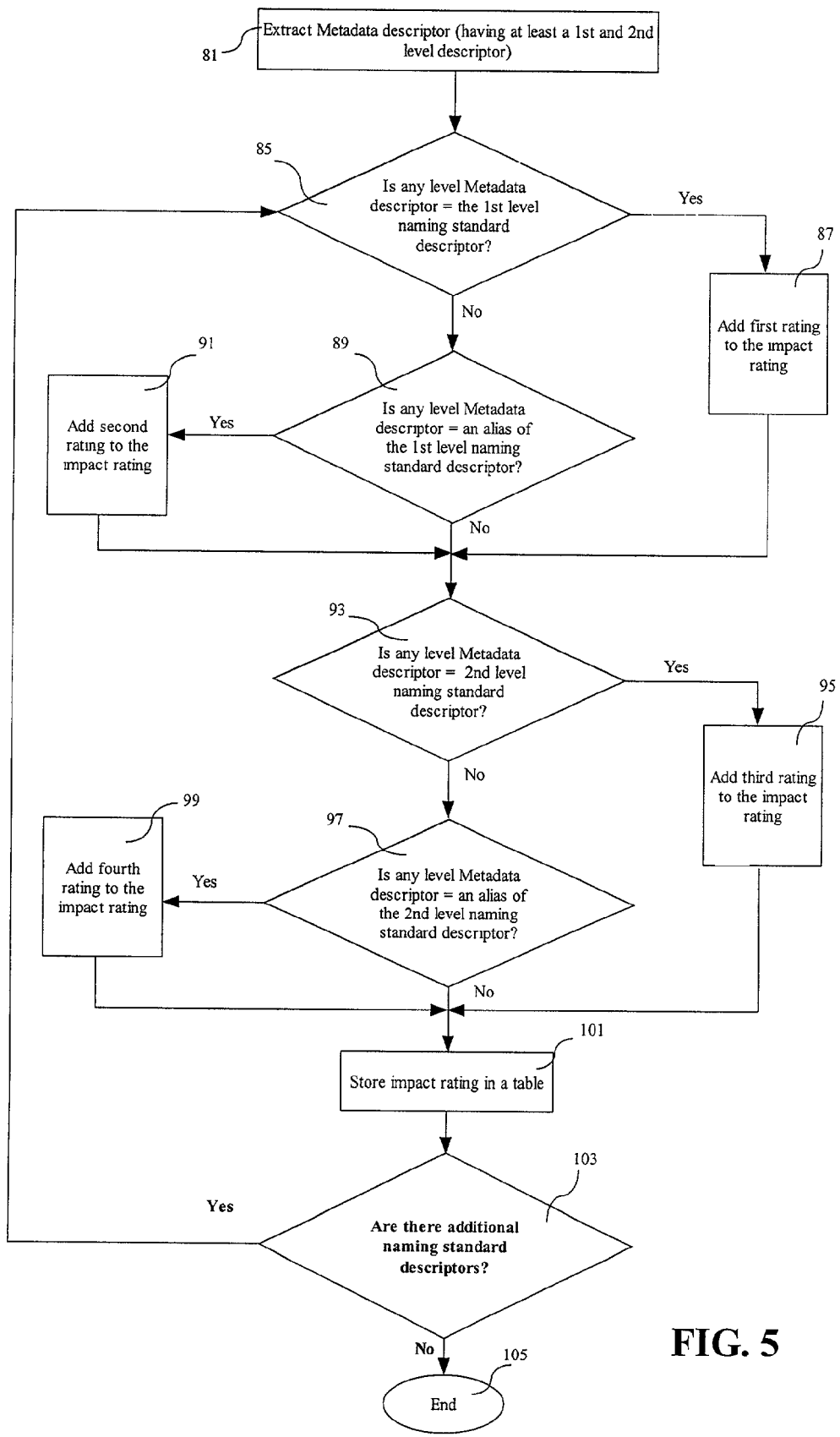
FIG. 5 is a flowchart showing an embodiment of a method of comparing two metadata descriptors.

FIG. 5 is an exemplary flow of the comparison between two metadata descriptors, such as the metadata descriptor and naming standard descriptor shown in FIG. 4. The steps shown in FIG. 5 may be performed by a software program, such as software programs 12 run from the naming standard database 13 shown in FIG. 2. The flow shown in FIG. 5 pertains to a first database that includes metadata descriptors having at least two levels and a second naming standard database that also includes metadata descriptors having at least two levels. It is often the case when studying the organization of metadata descriptors in a database that the hierarchy of levels in the database is unknown. In the example shown in FIG. 5, the hierarchy of the metadata descriptor levels in the first databases is unknown. However, the hierarchy of the metadata descriptors in the naming standard database is such that the first level is "primary," and the second level is "secondary." In other words, the first level is more important to indicate a relationship than the second level.

The flow shown in FIG. 5 compares one metadata descriptor from the first database to each metadata descriptor in the second (naming standard) database, and calculates an "impact rating" between the metadata descriptor in the first database to each descriptor in the second database. An "impact rating" is a relative rating assigned to the comparison between metadata descriptors that provides an indication of the similarity between two metadata descriptors. For example, if two metadata descriptors are identical, the rating assigned is relatively higher than if the two metadata descriptors are equivalents in an alias table. Preferably, the relative rating is between about five percent and about thirty percent higher if the metadata descriptors are identical than if they are equated in an alias table. More preferably, the relative rating is between about ten percent and about twenty percent higher if the metadata descriptors are identical. Most preferably, the relative rating is about fifteen percent higher if the metadata descriptors are identical.

In one embodiment pertaining to a naming standard that includes a hierarchy of levels, if the primary level of the naming standard appears similar to a level of the metadata descriptor, a relatively higher rating is assigned than if the secondary level appears similar. Preferably, the relative rating is between about five percent and about thirty percent higher if the primary level of the naming standard appears similar than if a secondary level appears similar. More preferably, the relative rating is between about ten percent and about twenty percent higher if the primary level of the naming standard appears similar than if a secondary level appears similar. Most preferably, the relative rating is about fifteen percent higher if the primary level of the naming standard appears similar than if a secondary level appears similar.

According to the steps shown in FIG. 5, various levels of impact ratings are assigned if predefined conditions are met. In the example shown in FIG. 5, the various impact ratings are termed "level one impact," "level two impact," etc. These levels of impact are a point or rating system for ranking similarities between metadata descriptors. The predefined conditions include the determination of similarities between metadata descriptor levels from a first database and metadata descriptor levels in a naming standard database. The various impact ratings are summed to determine the total impact rating between a metadata descriptor from a first database and metadata descriptors in a naming standard database. In other words, each time predefined conditions are met, a corresponding level of impact is added to the total impact rating between two metadata descriptors.

At step 81 in FIG. 5, a software program, such as software programs 12 in FIG. 2 extracts a metadata descriptor from a first database. Extracting metadata descriptors includes reading and identifying metadata descriptors. Next, the software program compares the metadata descriptor levels to the naming standard descriptor levels in the second database. The second database includes a list of naming standard descriptors. Each naming standard descriptor has at least two levels. Specifically, the software program compares each level metadata descriptor to the first level naming standard descriptor. If the metadata descriptor is equal to the first level naming standard descriptor at step 85, a first impact rating is added to the impact rating between the metadata descriptor and the naming standard descriptor at step 87. The software program keeps a record of the impact rating, for example, using a variable. When a predefined set of criteria is met, an impact rating, such as the first impact rating, is added to the impact rating between the metadata descriptor an the naming standard descriptor.

On the other hand, if any metadata descriptor is equal to an alias of the first level naming standard descriptor at step 89, a second impact rating is added to the impact rating at step 91. The software program determines if a metadata descriptor is equal to an alias of the first level naming standard descriptor by checking whether the metadata descriptor is found in an alias table corresponding to the first level naming standard descriptor. If the levels are equal without using an alias table, it is expected that the relationship is probably stronger than if the levels are equivalent in an alias table. Therefore, preferably, the first impact rating is higher than the second impact rating.

At step 93, if any level of the metadata descriptor is equal to the second level of the naming standard metadata descriptor, a level three rating is added to the impact rating at step 95. Alternatively, if any level metadata descriptor is equal to an alias of the second level naming standard metadata descriptor, a level four probability is added to the impact rating at step 99. Once again, if the levels are equal, it is expected that the relationship is probably stronger than if the levels are equivalent in an alias table. Thus, the third impact rating is preferably higher than the fourth impact rating. In addition, the naming standard is configured such that the first level is more important to a relationship than the second level. Therefore, it is also preferable that the first impact is greater than the third impact, and the second impact is greater than the fourth impact.

At step 101, the software program stores the impact rating in a table. At step 103, the software program checks the second database to determine if there are additional naming standard descriptors in the second database. If there are additional naming standard descriptor at step 103, the software program repeats steps 85, 87, 89, 91, 93, 95, 97, 99, and 101 for the next naming standard descriptor, beginning at step 85. If there are no additional naming standard descriptors at step 103, the program routine ends at step 105. When the program has ended at step 105, the program has calculated and stored an impact rating between a single metadata descriptor and each naming standard descriptor in the second naming standard database. An administrator or another software program may then select the naming standard descriptors with the highest impact rating for further investigation to determine whether there is a match. In addition, the impact ratings may be useful as an indication of the impact a change to the metadata descriptor could have in other related databases that have been mapped to the naming standard database. The steps in FIG. 5 may be repeated for all metadata descriptors in the first database.

If the steps in FIG. 5 are repeated for all metadata descriptors in the first database, the resulting output is a table of impact ratings between each metadata descriptor in the first database and all metadata descriptors in the naming standard database. The resulting tables of impact ratings can be analyzed either manually or through an automated process. For example, a computer administrator could manually pick out the highest impact ratings to identify likely candidates for one-to-one mapping. The relationship between high impact metadata descriptors could be further investigated manually. Alternatively, the tables of impact ratings can be processed automatically to identify pairs of high impact metadata descriptors. A computer program could graph the impact ratings for analysis by an administrator. In another example, a computer program could automatically identify the impact ratings above a predefined amount or the impact ratings that rank in a predefined percentile. For example, a computer program could make another table of impact ratings that includes only the ratings and their corresponding metadata descriptor pairs above about seven on a scale of one to ten, or of impact ratings in the highest twenty percent.

Identifying high impact metadata descriptor pairs eliminates most or all of the tedious process of manually mapping metadata descriptors that describe the same data. Metadata descriptor pairs having a relatively high impact rating have a relatively high probability of describing the same data.

In addition, a table of impact ratings can be useful to estimate the effect of a change in a first database to other databases that communicate with the first database. For example, a computer administrator may want to increase the character string size of a variable in the first database. The steps in FIG. 5 can be used to form a table comparing the metadata for which a change is desired with one or more databases. If high impact ratings are observed between the metadata for which a change is desired and metadata in other databases, than the administrator can examine the metadata in the other databases to make appropriate changes. The computer administrator can also estimate how many changes will need to be made in other databases based on the number of relatively high impact ratings.

EXAMPLE 2

Exemplary Database and Naming Standard Hierarchy

Figure 6:
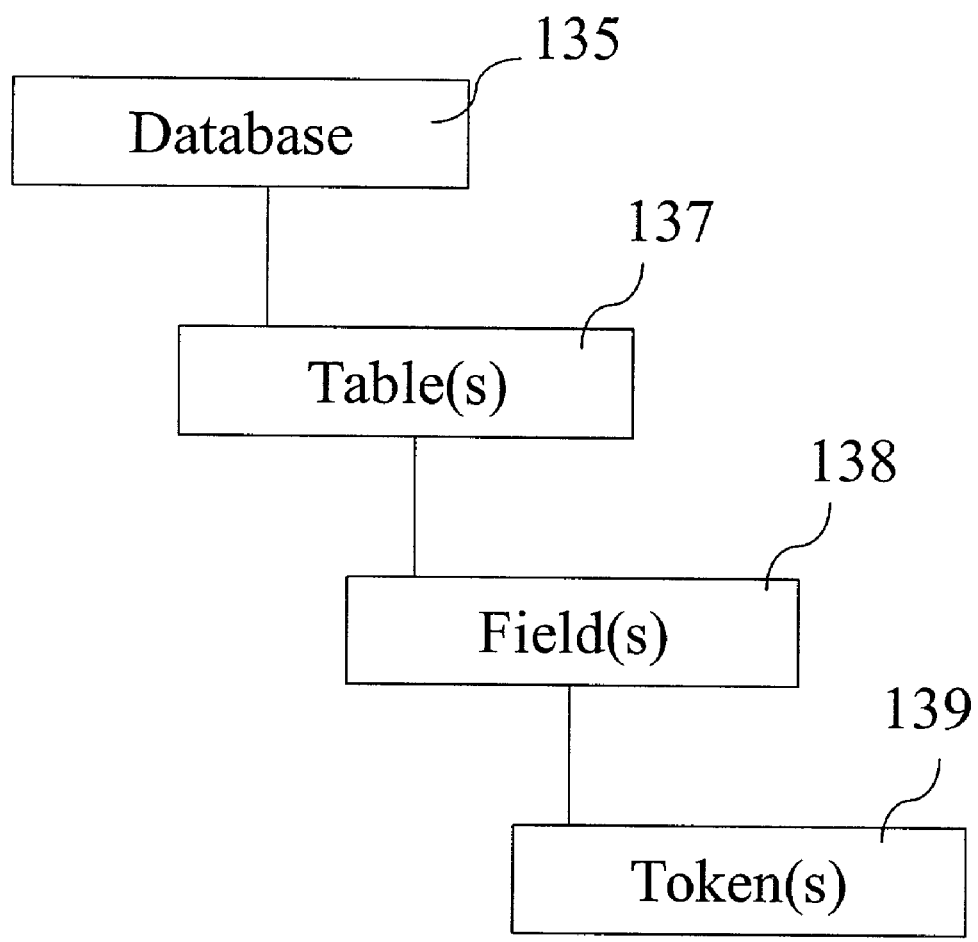
FIG. 6 is a diagram of components of an exemplary database.

FIG. 6 is an example of a logical view of the organization of metadata in a typical database. The database 135 includes one or more tables 137 of data. A table 137 includes metadata named to describe the data contained in the table. The table 137 also includes fields 138. Each field 138 includes metadata named to describe the data contained in the field 138. Each field 138 can be broken into tokens 139. In an example of a database 135 that includes information about customers, a table 137 could be named "customer," one field might be the customer's name, called "customer_name," and the tokens of the field are "customer" and "name." Tokens are an example of metadata levels. In this example, the metadata descriptors include table names and field names. The database 135 depicted in FIG. 6 has an ordered hierarchy of metadata such that the table name metadata descriptor is more important to determining a relationship than the field metadata descriptor. Within the metadata tokens that comprise the field descriptor, there is no hierarchy.

Figure 7:
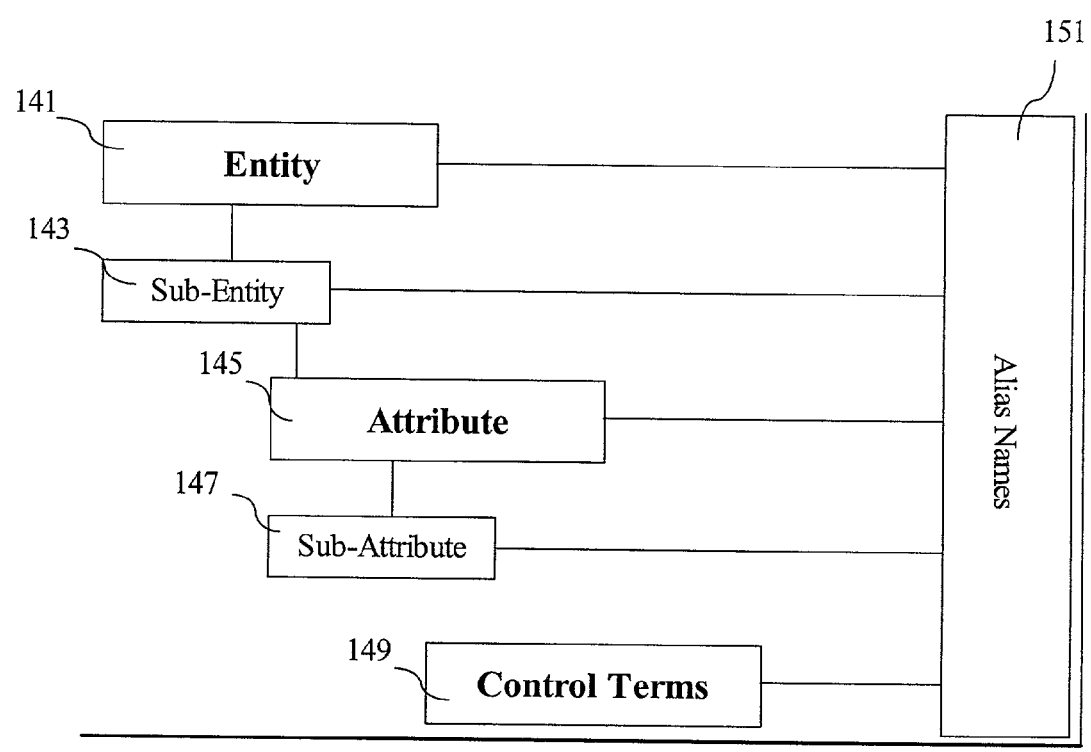
FIG. 7 is a diagram of an embodiment of a naming standard.

FIG. 7 is an example of a logical view of a hierarchical naming standard. The naming standard includes various descriptors that are ranked according a hierarchical importance. The descriptors in the naming standard may use any terminology. In the example shown, the naming standard includes an entity 141, which has the greatest hierarchical importance. The entity may include a subentity 143, which is of less importance. An attribute 145 may be associated with the entity 141, which is of less hierarchical importance, and the attribute may include a subattribute 147, which is of even less importance. The naming standard may also include control terms 149. Control terms 149 are generally of the least hierarchical importance compared to the other descriptors in the naming standard, and are generally metadata descriptors that may be associated with any number of entities 141 or attributes 145 in a database. Each of these metadata descriptors: entity 141, subentity 143, attribute 145, subentity 147, and control terms 149, are associated with alias names 151. The alias names 151 are an alias table for determining relationships between metadata descriptors 141, 143, 145, 147, 149 and similar related terms. For example, the alias table for "customer" could include "cust," "custr," "cst," "buyer," "shopper," etc.

The hierarchical structure of the naming standard shown in FIG. 7 is useful for ranking the importance of similar components in a known naming standard metadata descriptor compared to an unknown metadata descriptor. If a similarity is detected between the entity and a component in an unknown metadata descriptor, a higher impact rating is assigned to the relationship than if a similarity is detected only between the attribute and the component in the unknown metadata descriptor.

A metadata descriptor from a database, such as the database depicted in FIG. 6, may be compared with a naming standard database, such as the hierarchical naming standard depicted in FIG. 7. The relative strength of relationship for each hierarchical component of the naming standard in FIG. 7 is determined for a metadata descriptor from a database such as that shown in FIG. 6. The relative strength of relationship is determined by comparing the table name or token components of the metadata descriptor to the components of the naming standard descriptor, specifically, entity, subentity, attribute, subattribute, and control word.

Figure 8:
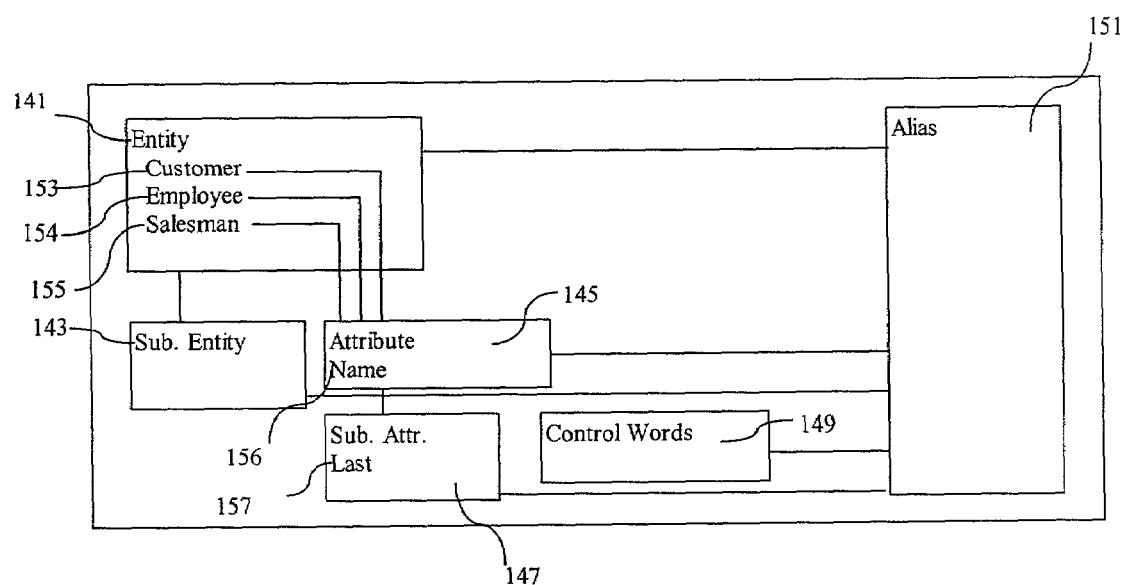
FIG. 8 is a diagram of another embodiment of a naming standard.

FIG. 8 is another embodiment of a naming standard that shows an example of several entities, each having the same attributes and subattributes. The entity 141 metadata descriptors in this example include "customer" 153, "employee" 154, and "salesman" 155. Each of the entity metadata descriptors 153, 154, and 155 are connected with an attribute 145, that is entitled "name" 156, and a subattribute 147, that is entitled "last" 157. There are no subentity words 143 or control words 149 shown in this example. However, an example of a subentity 143 that might be associated with the entity "employee" 154 could be "cashier" or another type of employee. Control words 149 are metadata descriptors that are not always associated with other descriptors such as a date or time. Each of the descriptors 153, 154, 155, 156, and 157 and a list of equivalents are included in the alias table 151.

A metadata descriptor from a first database is compared with a metadata descriptor from a second naming standard database. The metadata descriptor from the first database is organized according to FIG. 6. In other words, referring to FIG. 6, the metadata descriptor from the first database 135 includes a table name 137, a field name 138 which is comprised of tokens 139. The table name 137 and tokens 139 are compared to the hierarchy of the metadata descriptor illustrated in FIG. 7, an example of which is shown in FIG. 8. As will become better understood by the following discussion, a "relative strength of the entity relationship" (rsER) is determined, a "relative strength of the attribute relationship considering the relative strength of the entity relationship" (rsAttr) is determined, and then the "relative strength of the attribute relationship without considering the relative strength of the entity relationship" (rsAttr*) is determined. In addition, a relative strength of the subentity relationship (rsSER), a relative strength of the subattribute relationship (rsSAttr), and a relative strength of the control word relationship (rsCW) may also be determined. These values are combined to estimate an impact rating.

EXAMPLE 3

Determination of an Impact Rating (Mapping)

Figure 9:
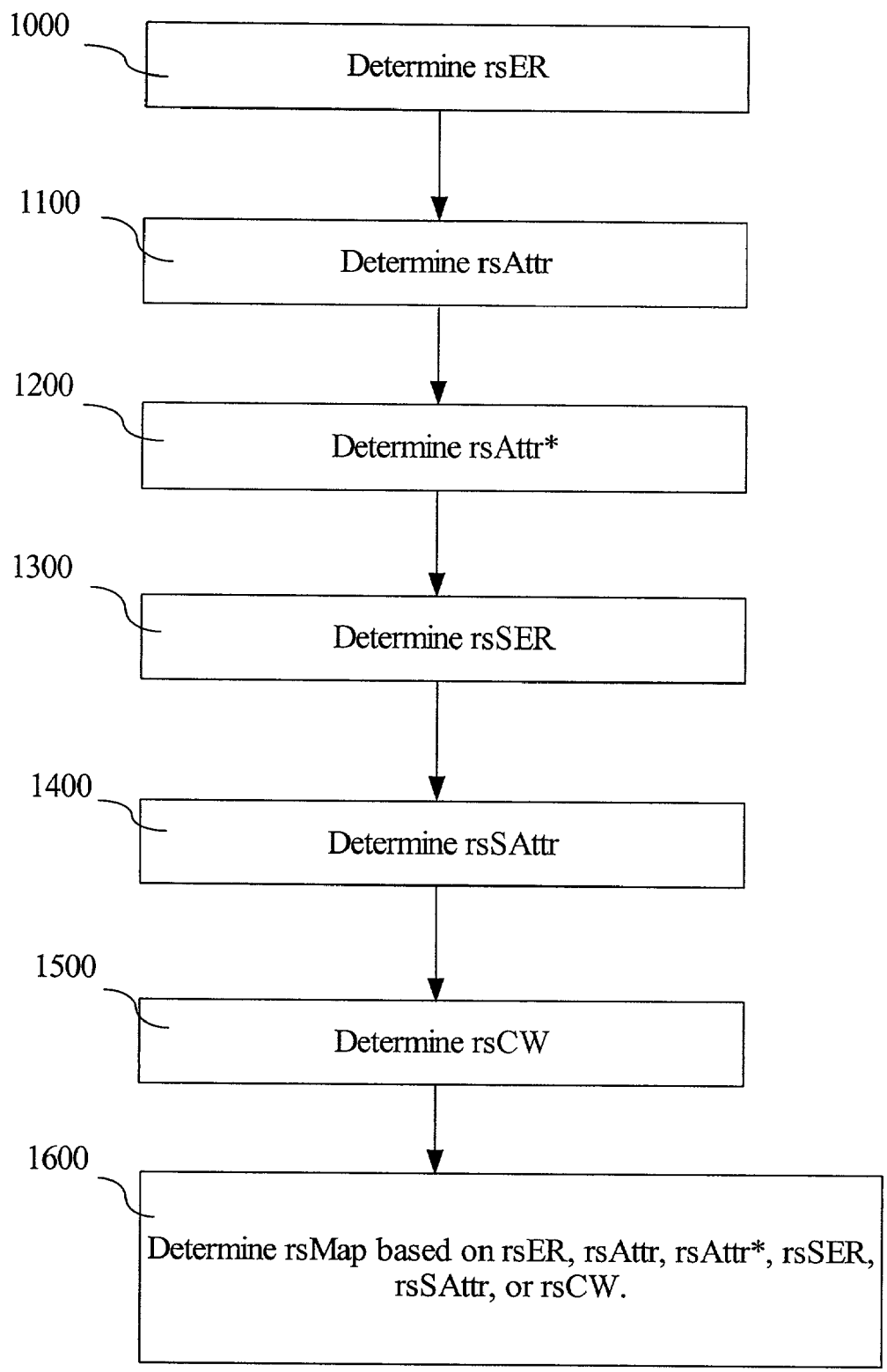
FIG. 9 is a flowchart showing an embodiment of a method of calculating the relative strength of the mapping relationship.

FIG. 9 shows an example of method to determine an impact rating between two metadata descriptors. The method shown in FIG. 9 uses the hierarchical naming standard depicted in FIG. 7. First, at step 1000, a software program determines a relative strength of the entity relationship (rsER). At step 1100, a relative strength of the attribute relationship (rsAttr) considering the rsER is determined. Because the entity relationship is more important than the attribute relationship, "considering the rsER" means that it is desirable to increase the rsAttr if the rsER is above a predetermined amount. For simplicity, as used herein, the predetermined amount is any positive value of rsER. However, the predetermined amount may be set at any level. A relative strength of the attribute relationship without considering the rsER (rsAttr*) (step 1200), a relative strength of the subentity relationship (rsSER) (step 1300), a relative strength of the subattribute relationship (rsSAttr) (step 1400), and a relative strength of the control word relationship (rsCW) (step 1500) are also determined. At least one of steps 1000, 1100, 1200, 1300, 1400, and 1500 must be performed in order to determine the relative strength of the mapping relationship (rsMap).

At step 1600, the software program determines a relative strength of the mapping relationship. The relative strength of the mapping relationship (rsMap) is the impact rating, i.e., a relative prediction of the overall relationship of one metadata descriptor (comprised of a table and tokens as shown in FIG. 6) to a naming standard descriptor shown in FIG. 7. The relative strength of the mapping relationship is determined by combining any number of relative strengths between components of the naming standard descriptors, specifically, entity, subentity, attribute, subattribute, and control words.

Various methods of calculating rsER, rsAttr, rsAttr*, rsSER, rsSAttr and rsCW are discussed below. In addition, various combinations of rsER, rsAttr, rsAttr*, rsSER, rsSAttr and rsCW may be used to calculate rsMap. Furthermore, any of the calculations for rsER, rsAttr, rsAttr*, rsSER, rsSAttr and rsCW (steps 100, 1100, 1200, 1300, 1400, and 1500) may be omitted entirely in calculating the rsMap. Each calculation for rsER, rsAttr, rsAttr*, rsSER, rsSAttr and rsCW increases the accuracy of the rsMap, however, only one of the calculations is necessary to determine an rsMap at step 1600. The rsER is the most important single calculation because it indicates the relationship to the entity, which is the highest metadata descriptor in the naming standard hierarchy.

The following equations are examples of equations for determining the relative strength of the mapping relationship.

$RsMap = rsER$ $RsMap = rsER + rsAttr$ $RsMap = rsER + rsAttr + rsAttr*$ $$RsMap = \frac{4(rsER) + 2(rsAttr) + rs(Attr*)}{7}$$

$RsMap = rsER + rsAttr + rsAttr* + rsSER$ $RsMap = rsER + rsAttr + rsAttr* + rsSER + rsSAttr$ $RsMap = rsER + rsAttr + rsAttr* + rsSER + rsSAttr*$ $RsMap = rsER + rsAttr + rsAttr* + rsSER + rsSAttr + rsCW*$ As would be understood by one of ordinary skill in the art, the relative relationship strength values, rsER, rsAttr, rsAttr*, rsSER, rsSAttr and rsCW, may be adjusted or weighted based on hierarchical importance. For example, in the following preferred equation, the rsER is weighted by a factor of four, the rsAttr value is weighted by a factor of two, and the rsAttr* value is not weighted.

$$RsMap = \frac{4(rsER) + 2(rsAttr) + rs(Attr*)}{7}$$

These weighted values have been assigned based on the importance of the entity and attribute in the naming standard hierarchy. Although it is not necessary to divide the weighted result by seven, dividing the weighted result by seven normalizes the rsMap value to a single unit. In other words, if rsER, rsAttr, and rsAttr are all on a scale of one to ten, then the rsMap will also be on a scale of one to ten. Because the relative strengths of the relationships are relative and not absolute, the absolute value of any relative strength values are evaluated in relation to other values. Therefore, the scale of the relative strength values is immaterial, but must be consistent if relative strength relationship values are compared.

EXAMPLE 4

Determination of RSER

Figure 10:
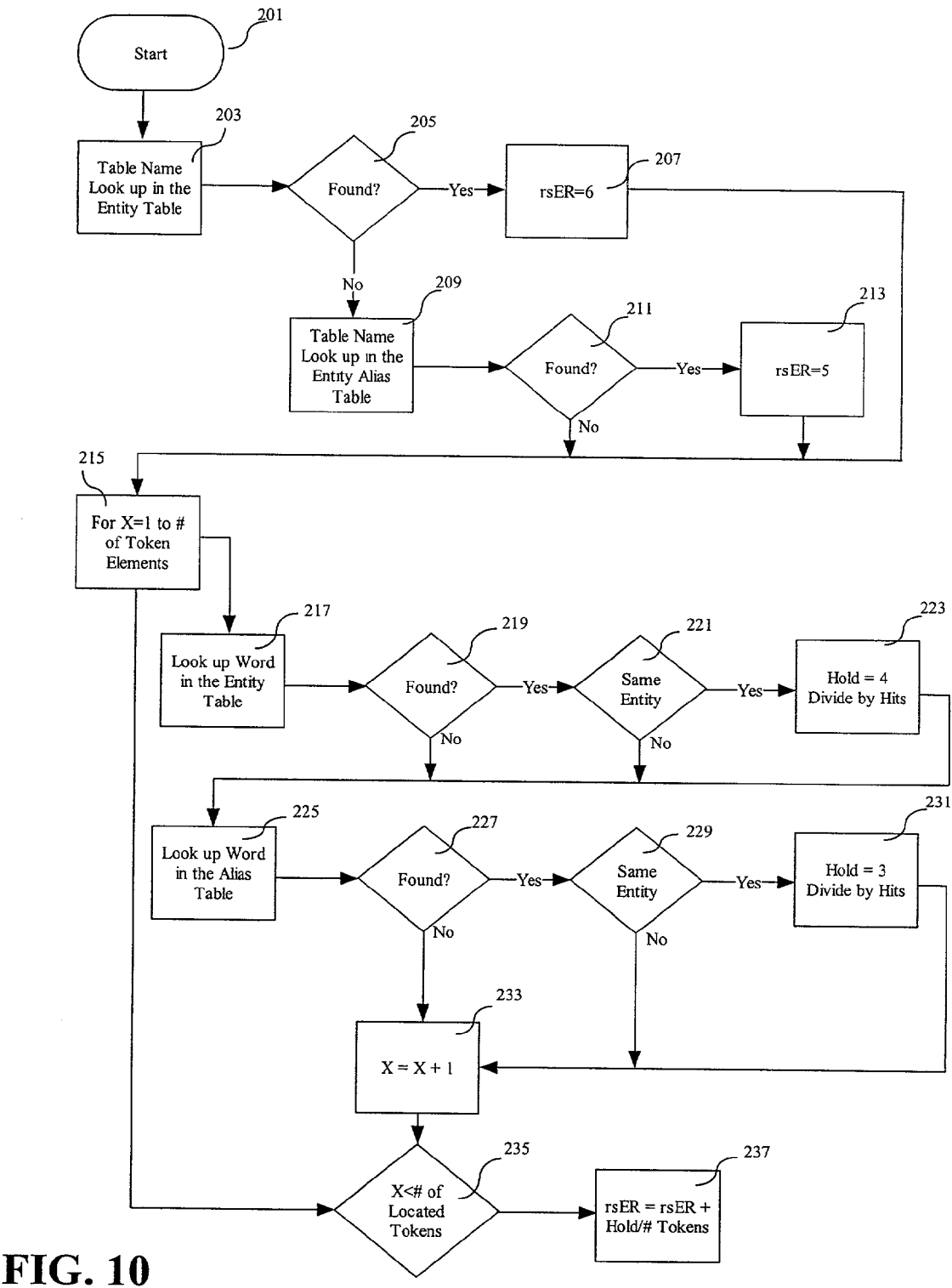
FIG. 10 is a flowchart showing an embodiment of a method of calculating the relative strength of the entity relationship.

FIG. 10 shows a method of calculating the relative strength of the entity relationship. The entity is the highest level of metadata descriptor in the naming standard hierarchy, as shown in FIGS. 7 and 8. The software program assigns various impact ratings to the rsER associated with the entity in a variable or other comparable software construct such as a holding variable with a pointer to the rsER associated with the entity. The software program then stores the impact ratings, or rsER values, in a table for further analysis. Further analysis of rsER values may include the calculation of an rsMap according to the method shown in FIG. 9.

A software program starts at step 201, and compares the table name of the metadata descriptor from the first database to entities in the second database at step 203 by looking the table name up in an entity table. If the table name is found in the entity table at step 205, the then the rsER for that particular entity is assigned a first impact rating at step 207. In the example shown, the first impact rating assigned if the table name is found in the entity table at step 205 is 6. The first impact rating indicates that a relatively strong relationship may exist between the metadata descriptor from the first database and the entity in the second database.

If the table name is not found at step 205, the software program searches for the table name in the alias table at step 209. If the table name is found in the alias table at step 211, then the rsER is assigned a second impact rating at step 213. Because equating the table name to an alias of the entity is a weaker indication that the entity and table are related than if the table name were equal to the entity, the second impact rating is preferably lower than the first impact rating. In the example shown, the second impact rating assigned if assigned if the table name is equated in an alias table at step 211 is 5. The second impact rating also indicates that a relatively strong relationship may exist between the metadata descriptor from the first database and the entity in the second database.

As discussed above and illustrated in FIG. 6, each table includes field names, and each field name may be broken into its component token elements. In other words, token elements are assigned to a particular field in a table. At step 215, for each token element assigned to a particular field, software program searches for the token element in an entity table at step 217. If the software program finds the token in the entity table at step 219 and the table name is also the same entity at step 221, then a third rating is assigned to the particular entity in the entity table at step 223. However, if more than one token is found in the entity table, this is an indication that the impact rating should be decreased. For example, if the terms "customer" and "employee" are both tokens in the same field and are listed as separate entities in the naming standard, it is not clear whether the field should be associated with a customer entity or an employee entity. Therefore, the third impact rating is divided by the number of token "hits" in the entity table at step 223. In the example shown, the third impact rating is 4. The impact rating is recorded to a temporary variable, called a "hold" in this example.

At step 225, the software program searches for the token in the alias table. If the token is found in the alias table at step 277 and the table is also the same entity at step 229, then a fourth rating is added to the "hold" variable at step 231. Once again, if more than one token is found in the alias table, this is an indication that the impact rating should be decreased. Therefore, the fourth impact rating is divided by the number of token "hits" in the entity alias list at step 231. In this example, the fourth impact rating is 3.

At step 233, the software program considers the next token in the field for the loop consisting of steps 271, 219, 221, 223, 225, 227, 229, and 231 by advancing a counter if the counter is less than the number of tokens at step 235. If the counter is greater than the number of tokens at step 235, then the relative strength of the entity relationship (rsER) is equal to the rsER (calculated at 207 or step 213) plus the hold variable divided by the number of token hits at step 237.

EXAMPLE 4A

Calculation of RSER

The following example demonstrates the method shown in FIG. 10 in the instance that the table name is "customer" and the field name is "cust_last_name." The naming standard includes a "customer" entity with an associated attribute of "name" and a subattribute of "last." The alias table for "customer" in the entity alias table includes the term "cust." "Name" and "Last" are not entities or aliases of entities in the naming standard.

The software program starts at step 201. At step 203, the software program searches the entities in the naming standard database, such as a database using the naming standard show in FIG. 7, for the table name "customer." Because "customer" is an entity in the naming standard, the table name is found at 206, and an rsER value of 6 is assigned. There is no need to search for the table name in the alias table in steps 209, 211, and 213.

In this example, there are three tokens in the field: "cust," "last," and "name." Therefore a counter is set at step 215 running from one to three. For the first token "cust," at step 217, the program searches the entities for the term "cust." Because the entities in the naming standard include the term "customer" and not the term "cust," the term is not found at step 219. At step 225, the software program searches the entity alias table for the term "cust." As stated above, the term "cust" is in the alias table for "customer" in the entity alias table, and therefore the term is found at step 227. The table name "customer" matches the entity name at step 229 because the table name is the same as the entity name. Therefore, the software program assigns a "three" to the temporary hold value. At step 233, the program routine increments the counter to examine the second token. The counter is less than the number of tokens and therefore, the software program returns to step 215.

At step 217, the term "name" is searched in the entity list. Because "name" is not an entity or an alias of an entity, the term name will not be found at step 219 or at steps 225 and 227. At step 233, the program routine increments the counter to examine the third token. The counter is less than the number of tokens and therefore, the software program returns to step 215. Similarly, at step 217, the term "last" is searched in the entity list. Because "last" is not an entity or an alias of an entity, the term name will not be found at step 219 or at steps 225 and 227. At step 233, the counter is incremented to "four," and then at step 235, the counter is greater than the number of tokens.

At step 237, the software program determines that the relative strength of the entity relationship is equal to the rsER calculated in step 207, that is "six," plus the hold variable divided by the number of token "hits" in the entity list. Because there was only one token found in the entity list or an alias of the entity list, the number of hits is "one," and the hold variable was calculated at step 231 to be "three." Therefore, the rsER calculated in this example is 6+3=9.

EXAMPLE 5

Determination of RSATTR

Figure 11:
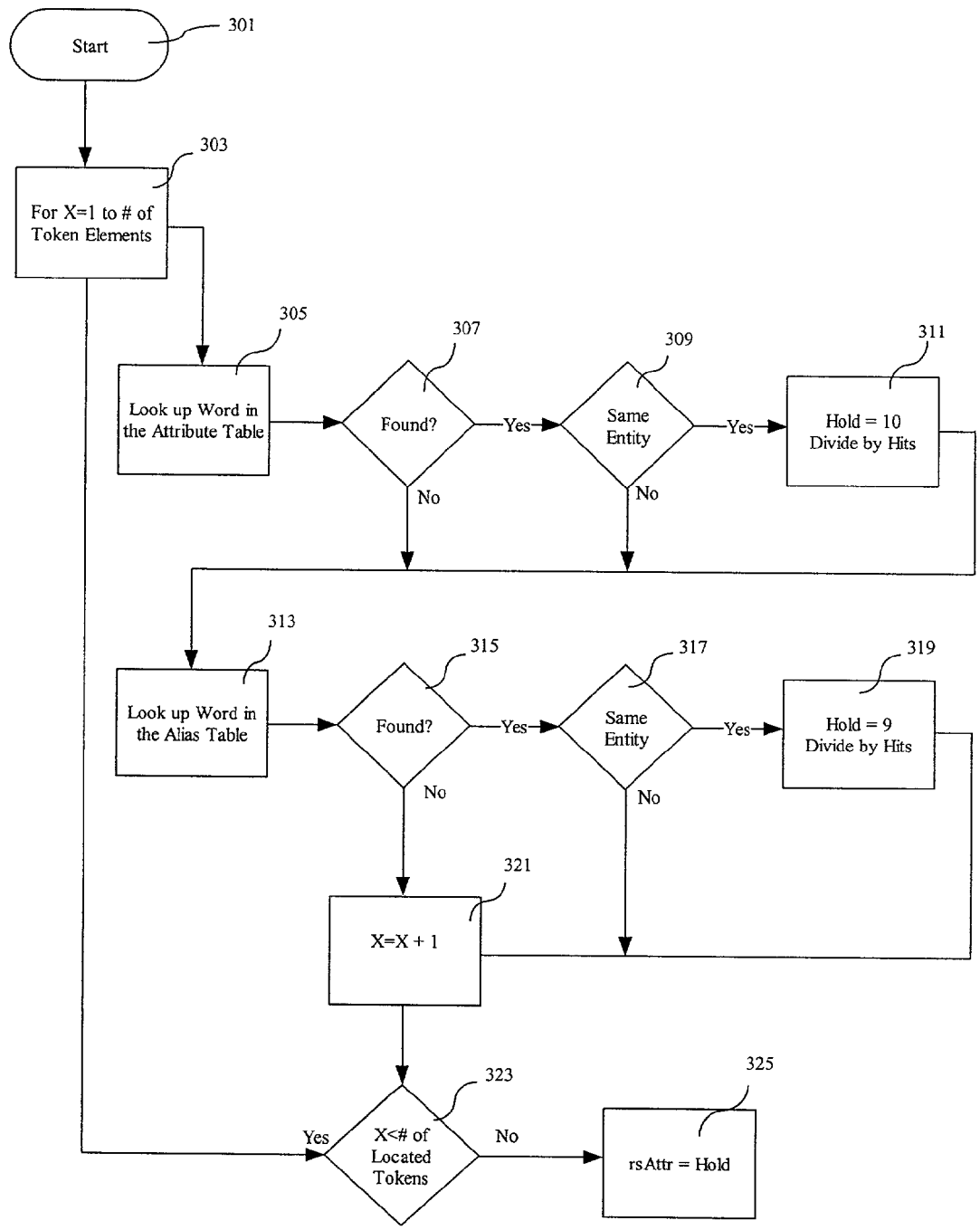
FIG. 11 is a flowchart showing an embodiment of a method of calculating the relative strength of the attribute relationship.

FIG. 11 shows a method of calculating the relative strength of the attribute relationship considering the relationship of the entity. The attribute is lower than the entity in the naming standard hierarchy, as shown in FIGS. 7 and 8. The software program assigns various impact ratings to the rsAttr associated with the attribute in a variable or other comparable software construct such as a holding variable with a pointer to the rsAttr. The software program then stores the impact ratings, or rsAttr values, in a table for further analysis. Further analysis of rsAttr values may include the calculation of rsMap according to the method illustrated in FIG. 9.

A software program starts at step 301. At step 303, the software program sets a variable "X" to count the number of token in the field of a selected metadata descriptor, such as a metadata descriptor shown in FIG. 6. For each token, the software program searches the attribute table for the token at step 305. If the token is found in the attribute table at step 307, and the table name is the same as the entity associated with the attribute at step 309, then a fifth impact rating is assigned to a temporary "hold" variable at step 331. If more than one token is found in the attribute table, the rsAttr should be reduced because it is unclear whether the field tokens match the naming standard. Therefore, the hold variable is divided by the number of token "hits" in the attribute table at step 311. In the example shown, the fifth impact rating is a ten.

At step 313, the software program searches for the token in the alias table. If the token is found in the alias table at step 315 and the table name is the same as the entity associated with the attribute at step 317, then the software program sets the hold variable equal to a sixth rating. If more than one token is found in the attribute alias table, the rsAttr should be reduced because it is unclear whether the field tokens match the naming standard. Therefore, the hold variable is divided by the number of token "hits" in the attribute table at step 319. In the example shown, the sixth impact rating is a nine.

At step 321, the software program increments the counter "X" by one to indicate that the software program will examine the next token through steps 305, 307, 309, 311, 313, 315, 317, and 319. If the counter is less than the number of tokens at step 323, the software program will examine the next token through steps 305, 307, 309, 311, 313, 315, 317, and 319. Once the software program has examined all tokens in the selected field, then the software program sets relative strength of the attribute (rsAttr) for the field equal to the "hold" variable at step 325.

EXAMPLE 5A

Calculation RSATTR

The following example demonstrates the method shown in FIG. 11 in the instance that the table name is "customer" and the field name is "cust_last_name." The naming standard includes a "customer" entity with an associated attribute of "name" and a subattribute of "last." The alias table for "customer" in the entity alias table includes the term "cust." "Name" and "Last" are not entities or aliases of entities in the naming standard.

The software program starts the calculation at step 301. There are three tokens in the field name: "cust," "last," and "name." Therefore, at step 303, the program sets a counter from one to three token elements. "Cust" is the first token considered. At step 305, the program searches for the term "cust" in the attribute table. Because "cust" is not an attribute, it is not found at step 307. At step 313, the program routine searches the attribute alias table for the word "cust." Because "cust" is not an alias of any attribute in the table, it is not found in the alias table at step 315, and the counter is incremented at step 321. The counter is less than the number of tokens at step 323, and therefore the program loops to step 303.

At step 305, the software program searches the attribute table for the "last" token. Because "last" is a subattribute, "last" is not found at step 307. The software program searches the attribute alias table at step 313, and last is not found at step 315. Next, the software program increments the counter "X" from one to two at step 321. The software program checks the value of the counter compared with the total number of tokens at step 323. The counter is less than the number of tokens at step 323, and therefore, the program begins examination of the next token, which is the token "name," at step 303.

At step 305, the software program searches the attribute table for the "name" token. Because "name" is an attribute, the token "name" is found at step 307. The software program determines that the entity is the same as the table name at step 309, and therefore adds a third impact rating to a temporary variable. In the example shown, the third impact rating is ten. The third impact rating is divided by the number of "hits," that is, the number of tokens found in the attribute table. In the example shown, only "name" has been found in the attribute table, and the number of "hits" is one.

At step 313, the token "name" is searched in the attribute alias table. Because "name" is an attribute and not an alias of an attribute, it is not found at step 315. At step 321, the counter is incremented to "three," and the counter is greater than the number of tokens at step 323. Thus, the program routine sets the rsAttr equal to the hold variable, which as calculated in step 311, is ten.

EXAMPLE 6

Determination of RSATTR*

Figure 12:
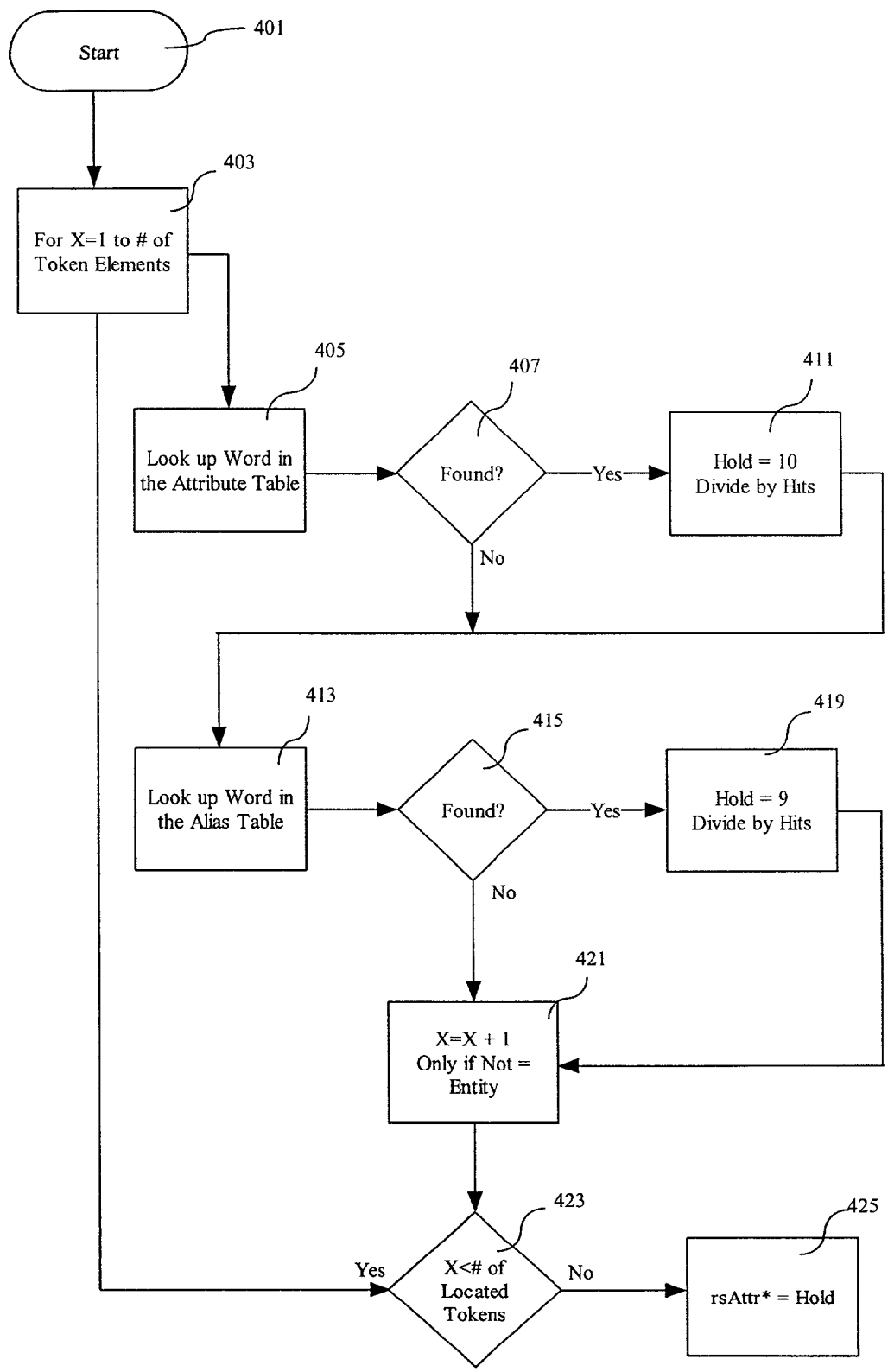
FIG. 12 is a flowchart showing an embodiment of a method of calculating the relative strength of the attribute without considering the entity relationship.

FIG. 12 shows the flow of the steps to calculate the relative strength of the attribute relationship without considering the strength of the entity relationship. As shown in the hierarchy of the naming standard in FIGS. 7 and 8, the attribute is lower and less important than the entity in the naming standard hierarchy. In addition, it is less important to examine the rsAttr* than rsAttr because rsAttr* does not include an examination of the entity relationship. A relationship between both the entity and the attribute indicates a relatively higher probability of a match between two metadata descriptors than a match of only the attribute. Therefore, the value of rsAttr is increased if an entity relationship (rsER) is established. On the other hand, the value of rsAttr* is not adjusted based on the entity relationship, and may be given less weight when considering the relationship of two metadata descriptors.

The software program assigns various impact ratings to the rsAttr* associated with the attribute in a variable or other comparable software construct such as a holding variable with a pointer to the rsAttr*. The software program then stores the impact ratings, or rsAttr* values, in a table for further analysis. Further analysis of rsAttr* values may include the calculation of rsMap according to the method illustrated in FIG. 9. The value of rsAttr* may be given less weight in a calculation of rsMap than the rsER or rsAttr values.

A software program starts at step 401. At step 403, the software program assigns a counter "X" for the number of token elements in the field. For each token in the field, the software program searches the attribute table for the token at step 305. If the token is found in the attribute table at step 407, then a fifth impact rating is assigned to a temporary "hold" variable at step 431. If more than one token is found in the attribute table, the rsAttr should be reduced because it is unclear whether the field tokens match the naming standard. Therefore, the hold variable is divided by the number of token "hits" in the attribute table at step 411. In the example shown, the fifth impact rating is a ten.

At step 413, the software program searches for the token in the alias table. If the token is found in the alias table at step 415, then the hold variable is equal to a sixth rating. If more than one token is found in the attribute alias table, the rsAttr should be reduced because it is unclear whether the field tokens match the naming standard. Therefore, the hold variable is divided by the number of token "hits" in the attribute table at step 419. In the example shown, the sixth impact rating is a nine.

At step 421, the software program increments a counter by one to indicate that the software program will examine the next token through steps 405, 407, 409, 411, 413, 415, 417, and 419. If the counter is less than the number of tokens at step 323, the software program will examine the next token through steps 405, 407, 409, 411, 413, 415, 417, and 419. One all tokens in a field have been examined, then the relative strength of the attribute (rsAttr) for the field is equal to the "hold" variable at step 425.

EXAMPLE 6A

Calculation of RSATTR*

The following example demonstrates the method shown in FIG. 12 in the instance the table name is "customer" and the field name is "cust_last_name." The naming standard includes a "customer" entity with an associated attribute of "name" and a subattribute of "last." The alias table for "customer" in the entity alias table includes the term "cust." "Name" and "Last" are not entities or aliases of entities in the naming standard.

The software program starts the calculation at step 401. At step 403, the program sets a counter corresponding to each token in the field. There are three tokens in the field name: "cust," "last," and "name." Therefore, at step 403, the program sets a counter from one to three token elements. "Cust" is the first token considered. At step 405, the program searches for the term "cust" in the attribute table. Because "cust" is not an attribute, it is not found at step 407. At step 413, the program routine searches the attribute alias table for the word "cust." Because "cust" is not an alias of any attribute in the table, it is not found at step 415, and the counter is incremented at step 421. The counter is less than the number of tokens at step 423, and therefore the program loops to step 403.

At step 405, the software program searches the attribute table for the "last" token. Because "last" is a subattribute, "last" is not found at step 407. The software program searches the attribute alias table at step 413, and last is not found at step 415. Next, the software program increments the counter to "two" at step 421. The counter is less than the number of tokens at step 423, and therefore, the program begins examination of the token "name" at step 403.

At step 405, the software program searches the attribute table for the "name" token. Because "name" is an attribute, the token "name" is found at step 407. The software program adds a third impact rating to a temporary "hold" variable. In the example shown, the third impact rating is ten. The third impact rating is divided by the number of "hits," that is, the number of tokens found in the attribute table. In the example shown, only "name" has been found in the attribute table, and the number of "hits" is one.

At step 413, the token "name" is searched in the attribute alias table. Because "name" is an attribute and not an alias of an attribute, it is not found at step 415. At step 421, the counter is incremented to "three," and the counter is greater than the number of tokens at step 423. Thus, the program routine sets the rsAttr equal to the hold variable, which as calculated in step 411, is ten.

EXAMPLE 6

Determination of rsSER, rsSAttr, and rsCW

Figure 13:
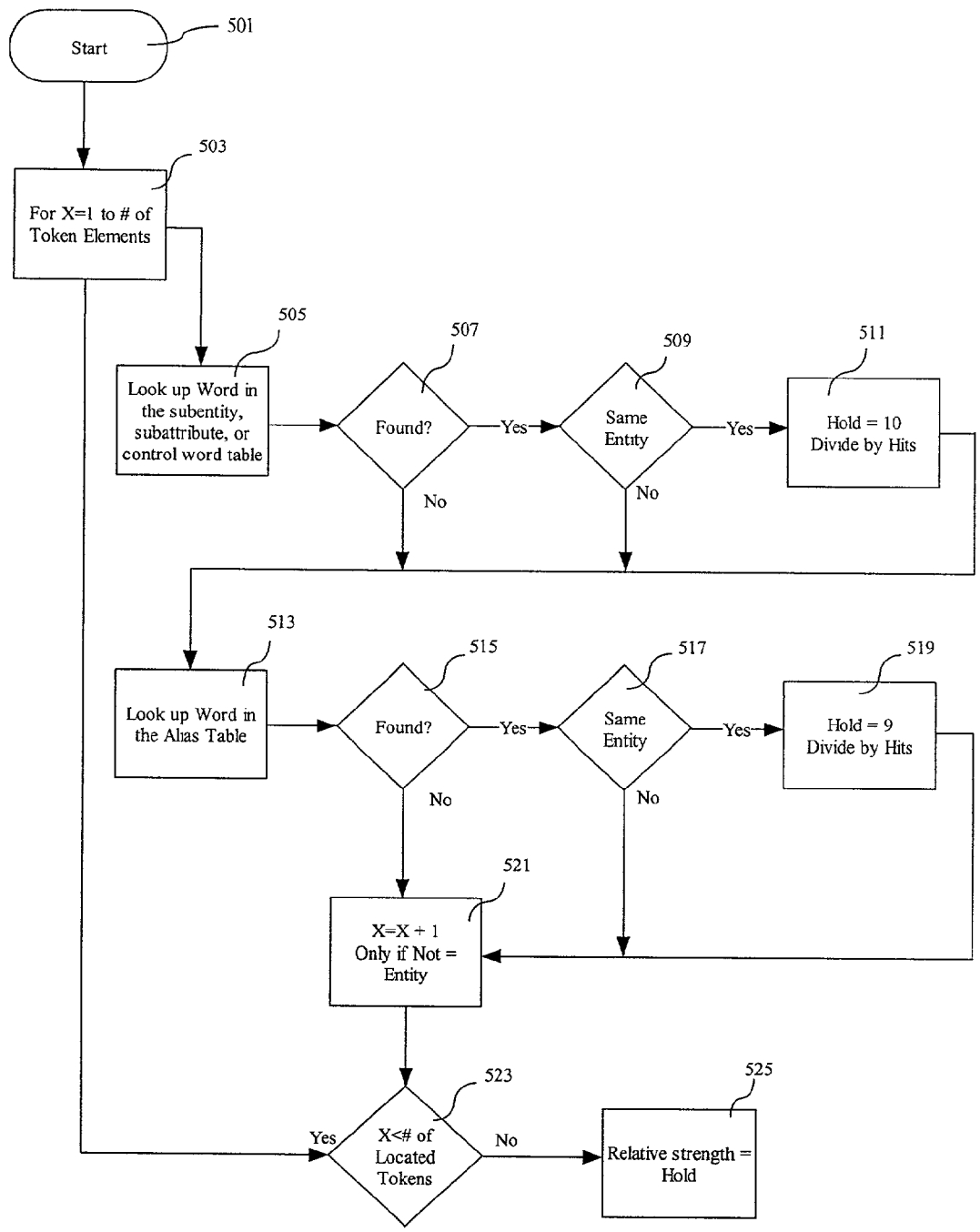
FIG. 13 is a flowchart showing an embodiment of a method of calculating the relative strength of the subentity, subattribute, or control word relationship.

FIG. 13 shows a method of calculating the relative strength of either the subentity, subattribute or the control word relationship with or without considering the relationship of the entity. These relative strength determinations are lower than the entity or subentity in the naming standard hierarchy, as shown in FIGS. 7 and 8. The software program assigns various impact ratings to the subentity, subattribute or the control word relationship associated with the relative strength relationship in a variable or other comparable software construct such as a holding variable with a pointer to the relative strength relationship studied. The software program then stores the impact ratings, or rsAttr values, in a table for further analysis. Further analysis of the subentity, subattribute or the control word relationship values may include the calculation of rsMap according to the method illustrated in FIG. 9.

For clarity and ease of presentation, FIG. 13 shows the steps to calculate the relative strength of the relationship with respect to subentity, subattribute, or control words. However, naming standards that use different terminology or different hierarchies of element may also used the steps shown to determine a relative strength of relationship.

A software program starts at step 501. For each token in the field at step 503, the software program searches the subentity, subattribute, or control word table, depending on which relationship is being examined, for the token at step 505. If the token is found in the table at step 507, and the table name is the same as the entity associated with the subentity, subattribute, or control word at step 509, then a fifth impact rating is assigned to a temporary "hold" variable at step 531. Step 509 may be skipped if the software program is examining the relationship of the subentity, subattribute, or control word without considering the relationship of the entity and table. The relationship of the entity and table is important to determining if a relationship exists. Therefore, while step 509 is optional, it is preferable to assign an impact rating to the relative relationship of the subentity, subattribute, or control word only if a relationship exists between the entity and table. If more than one token is found in the attribute table, the impact rating should be reduced because it is unclear whether the field tokens match the naming standard. Therefore, the hold variable is divided by the number of token "hits" in the subentity, subattribute, or control word table at step 511. In the example shown, the fifth impact rating is a ten.

At step 513, the software program searches for the token in the alias table for the subentity, subattribute, or control word. If the token is found in the alias table at step 515 and the table name is the same as the entity associated with the subentity, subattribute, or control word at step 517, then the hold variable is equal to a sixth rating. Step 517 may be skipped if the software program is examining the relationship of the subentity, subattribute, or control word without considering the relationship of the entity and table. If more than one token is found in the subentity, subattribute, or control word alias table, the impact rating should be reduced because it is unclear whether the field tokens match the naming standard. Therefore, the hold variable is divided by the number of token "hits" in the attribute table at step 519. In the example shown, the sixth impact rating is a nine.

At step 521, the software program increments a counter by one to indicate that the software program will examine the next token through steps 505, 507, 509, 511, 513, 515, 517, and 519. If the counter is less than the number of tokens at step 523, the software program will examine the next token through steps 505, 507, 509, 511, 513, 515, 517, and 519. One all tokens in a field have been examined, then the software program sets relative strength of the subentity, subattribute, or control word for the field equal to the "hold" variable at step 525.

EXAMPLE 6A

Calculation of rsSAttr

The following example demonstrates the method shown in FIG. 13 for determining a relative strength of the subattribute relationship where the table name is "customer" and the field name is "cust_last_name." The determination considers the relative strength of the entity relationship. The naming standard includes a "customer" entity with an associated attribute of "name" and a subattribute of "last." The alias table for "customer" in the entity alias table includes the term "cust." "Name" and "Last" are not entities or aliases of entities in the naming standard.

The software program starts the calculation at step 501. There are three tokens in the field name: "cust," "last," and "name." Therefore, at step 503, the program sets a counter from one to three token elements. "Cust" is the first token considered. At step 505, the program searches for the term "cust" in the subattribute table. Because "cust" is not a subattribute, it is not found at step 507. At step 513, the program routine searches the subattribute alias table for the word "cust." Because "cust" is not an alias of any subattribute in the table, it is not found at step 515, and the counter is incremented at step 521. The counter is less than the number of tokens at step 523, and therefore the program loops to step 503.

At step 505, the software program searches the subattribute table for the "last" token. Because "last" is a subattribute, "last" is found at step 507. The software determines that the entity is the same as the table name at step 509, and therefore adds an impact rating to a temporary variable. In the example shown, the impact rating is ten. The impact rating is divided by the number of "hits," that is, the number of tokens found in the attribute table. In the example shown, only "last" has been found in the subattribute table, and the number of "hits" is one. The software program searches the subattribute alias table at step 513, and last is not found at step 515. Next, the software program increments the counter to "two" at step 521. The counter is less than the number of tokens at step 523, and therefore, the program begins examination of the token "name" at step 503.

At step 505, the software program searches the attribute table for the "name" token. Because "name" is an attribute, the token "name" is not found at step 507. At step 513, the token "name" is searched in the subattribute alias table. Because "name" is an attribute and not an alias of a subattribute, it is not found at step 515. At step 521, the counter is incremented to "three," and the counter is greater or equal to than the number of tokens at step 523. Thus, the program routine sets the relative strength of the subattribute relationship equal to the hold variable, which, as calculated in step 511, is ten.

It will be apparent to those with skill in the art that there are many alterations that may be made in the embodiments of the invention described above without departing from the spirit and scope of the invention. For example, there are many ways that circuits and electronic elements may be combined to implement the method and system described herein in various systems and hardware environments. The present invention may be implemented in various network environments, computer systems, and database management environments. There are similarly many ways that independent programmers might provide software to provide the functionality associated with the present invention as taught herein without departing from the spirit and scope of the invention.

It will be apparent to those with skill in the art that there are many alterations that may be made in the embodiments of the invention described above without departing from the spirit and scope of the invention. For example, there are many ways that circuits and electronic elements may be combined to implement the method and system described herein in various systems and hardware environments. The present invention may be implemented in various network environments, including wireless and computer networks, or other networks supporting electronic devices. There are similarly many ways that independent programmers might provide software to provide the functionality associated with the present invention as taught herein without departing from the spirit and scope of the invention. Having thus generally described the invention, the same will become better understood from the following claims in which it is set forth in a non-limiting manner.

The invention claimed is:

1. A method for estimating impact in a computer system, comprising:

extracting a first metadata descriptor from a first database, wherein the first metadata descriptor and the first database are stored in a data store on a computer system and wherein the first metadata descriptor describes customer information in an organization;

comparing the first metadata descriptor to a second metadata descriptor, wherein the second metadata descriptor is stored in the data store in the computer system and describes the customer information in an organization and wherein the second metadata descriptor includes a table and a plurality of tokens, wherein each of the plurality of tokens comprises a portion of a field name in the table; and determining an impact rating between the first metadata descriptor and the second metadata descriptor wherein the impact rating predicts an indication of similarity between the first metadata descriptor and the second metadata descriptor in a plurality of databases in the computer system, wherein determining the impact rating comprises:

calculating a relative strength of an entity relationship (rsER) between the first metadata descriptor and the second metadata descriptor;

calculating a relative strength of an attribute relationship (rsAttr) between the first metadata descriptor and the second metadata descriptor, wherein said step of calculating a relative strength of the attribute relationship between the first metadata descriptor and the second metadata descriptor further comprises:

calculating a relative strength of the attribute relationship considering the relative strength of the entity relationship (rsAttr) between the first metadata descriptor and the second metadata descriptor; and calculating a relative strength of the attribute relationship without considering the relative strength of the entity relationship (rsAttr*) between the first metadata descriptor and the second metadata descriptor; and calculating a relative strength of a mapping (RsMap) between the first metadata descriptor and the second metadata descriptor, wherein RsMap is calculated using the formula:

$$RsMap = \frac{4(rsER) + 2(rsAttr) + rs(Attr*)}{7}$$

and wherein RsMap is the impact rating between the first metadata descriptor and the second metadata descriptor; and saving the impact rating.

2. The method of claim 1, wherein said step of calculating a relative strength of the attribute relationship considering the relative strength of the entity relationship (rsAttr) further comprises:

increasing the relative strength of the attribute relationship considering the relative strength of the entity relationship (rsAttr) if the relative strength of the entity relationship is above a predetermined amount.

3. The method of claim 1, wherein said step of calculating the relative strength of the entity relationship further comprises:

adding a first rating to the relative strength of the entity relationship if the entity of the first metadata descriptor is equal to the table of the second metadata descriptor;

determining if the entity of the first metadata descriptor is related to the table of the second metadata descriptor; and adding a second rating to the relative strength of the entity relationship if the entity of the first metadata descriptor is related to the table of the second metadata descriptor.

4. The method of claim 3, wherein determining if any two metadata descriptor levels are related comprises:

determining if the levels are equated in an alias table and are not equal.

5. The method of claim 3, wherein determining if any two metadata descriptor levels are related comprises:

determining if the levels contain similar characters.

6. The method of claim 3, wherein said first rating is higher than said second rating.

7. The method of claim 1, wherein said step of calculating the relative strength of the entity relationship further comprises:

adding a third rating to the relative strength of the entity relationship if the entity of the first metadata descriptor is equal to a token of the second metadata descriptor;

determining if the entity of the first metadata descriptor is related to a token of the second metadata descriptor; and adding a fourth rating to the relative strength of the entity relationship if the entity of the first metadata descriptor is related to the entity of the second metadata descriptor.

8. The method of claim 7, wherein the third rating is higher than the fourth rating.

9. The method of claim 7, wherein determining if any two metadata descriptor levels are related comprises:

determining if the levels are equated in an alias table and are not equal.

10. The method of claim 7, wherein determining if any two metadata descriptor levels are related comprises:

determining if the levels contain similar characters.

11. The method of claim 7, further comprising:

decreasing the third rating and the second rating if the first metadata descriptor includes a second entity from a second database.

12. The method of claim 7, further comprising:

decreasing the third rating by dividing the third rating by the number of entities from the first metadata descriptor in a second database.

13. The method of claim 1, wherein said step of calculating the relative strength of the attribute relationship further comprises:

adding a fifth rating to the relative strength of the attribute relationship if the attribute of the first metadata descriptor is equal to a token of the second metadata descriptor;

determining if the attribute of the first metadata descriptor is related to a token of the second metadata descriptor; and adding a sixth rating to the relative strength of the attribute relationship if the attribute of the first metadata descriptor is related to the entity of the second metadata descriptor.

14. The method of claim 13, wherein the fifth rating is higher than the sixth rating.

15. The method of claim 13, wherein determining if any two metadata descriptor levels are related comprises:

determining if the levels are equated in an alias table and are not equal.

16. The method of claim 13, wherein determining if any two metadata descriptor levels are related comprises:

determining if the levels contain similar characters.

17. The method of claim 13, further comprising:

decreasing the fifth rating and the sixth rating if the first metadata descriptor includes a second attribute from a second database.

18. The method of claim 13, further comprising:

dividing the fifth rating by substantially the number of time the attribute appears in a second database.

19. A method for estimating impact in a computer system, comprising:

extracting a first metadata descriptor from a first database, wherein the first metadata descriptor and the first database are stored in a data store on a computer system and wherein the first metadata descriptor describes customer information in an organization;

comparing the first metadata descriptor to a second metadata descriptor, wherein the second metadata descriptor is stored in the data store in the computer system and describes the customer information in an organization and wherein the second metadata descriptor includes a table and a plurality of tokens, wherein each of the plurality of tokens comprises a portion of a field name in the table;

determining an impact rating between the first metadata descriptor and the second metadata descriptor wherein the impact rating predicts an indication of similarity between the first metadata descriptor and the second metadata descriptor in a plurality of databases in the computer system:

calculating a relative strength of an entity relationship (rsER) between the first metadata descriptor and the second metadata descriptor;

calculating a relative strength of an attribute relationship (rsAttr) between the first metadata descriptor and the second metadata descriptor, wherein said step of calculating a relative strength of the attribute relationship between the first metadata descriptor and the second metadata descriptor further comprises:

calculating a relative strength of the attribute relationship considering the relative strength of the entity relationship (rsAttr) between the first metadata descriptor and the second metadata descriptor; and calculating a relative strength of a mapping (RsMap) between the first metadata descriptor and the second metadata descriptor, wherein RsMap is calculated using the formula:

$$RsMap = rsER + rsAttr$$

where RsMap is the relative strength of the mapping;
rsER is the relative strength of the entity relationship;
rsAttr is the relative strength of the attribute relationship considering the entity relationship; and
wherein the relative strength of mapping is the impact rating between the first metadata descriptor and the second metadata descriptor; and
storing the impact rating.

20. A method for estimating impact in a computer system, comprising:

extracting a first metadata descriptor from a first database, wherein the first metadata descriptor and the first database are stored in a data store on a computer system and wherein the first metadata descriptor describes customer information in an organization;

comparing the first metadata descriptor to a second metadata descriptor, wherein the second metadata descriptor is stored in the data store in the computer system and describes the customer information in an organization and wherein the second metadata descriptor includes a table and a plurality of tokens, wherein each of the plurality of tokens comprises a portion of a field name in the table;

determining an impact rating between the first metadata descriptor and the second metadata descriptor wherein the impact rating predicts an indication of similarity between the first metadata descriptor and the second metadata descriptor in a plurality of databases in the computer system:

calculating a relative strength of an entity relationship (rsER) between the first metadata descriptor and the second metadata descriptor;

calculating a relative strength of an attribute relationship (rsAttr) between the first metadata descriptor and the second metadata descriptor, wherein said step of calculating a relative strength of the attribute relationship between the first metadata descriptor and the second metadata descriptor further comprises:

calculating a relative strength of the attribute relationship considering the relative strength of the entity relationship (rsAttr) between the first metadata descriptor and the second metadata descriptor; and calculating a relative strength of the attribute relationship without considering the relative strength of the entity relationship (rsAttr*) between the first metadata descriptor and the second metadata descriptor; and calculating a relative strength of a mapping (RsMap) between the first metadata descriptor and the second metadata descriptor wherein RsMap is calculated using the formula:

$$RsMap = (rsER) + (rsAttr) + rsAttr*$$

where RsMap is the relative strength of mapping;
rsER is the relative strength of the entity relationship;
rsAttr is the relative strength of the attribute relationship considering the entity relationship;
rsAttr* is the relative strength of the attribute relationship without considering the entity relationship; and
wherein the relative strength of mapping is the impact rating between the first metadata descriptor and the second metadata descriptor; and
storing the impact rating.

* * * * *